(12) United States Patent
Li et al.

(10) Patent No.: US 11,095,238 B2
(45) Date of Patent: Aug. 17, 2021

(54) ELECTRIC TOOL AND CONTROL METHOD OF ELECTRIC TOOL

(71) Applicant: Nanjing Chervon Industry Co., Ltd., Nanjing (CN)

(72) Inventors: Wencheng Li, Nanjing (CN); Hongwei Wang, Nanjing (CN); Qian Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 0 days.

(21) Appl. No.: 17/135,579

(22) Filed: Dec. 28, 2020

(65) Prior Publication Data

US 2021/0119559 A1   Apr. 22, 2021

Related U.S. Application Data

(63) Continuation of application No. PCT/CN2019/094242, filed on Jul. 1, 2019.

(30) Foreign Application Priority Data

Jun. 29, 2018 (CN) .......................... 201810699098.2

(51) Int. Cl.
*H02P 6/15* (2016.01)
*B24B 47/12* (2006.01)
(Continued)

(52) U.S. Cl.
CPC .............. *H02P 6/153* (2016.02); *B24B 47/12* (2013.01); *H02K 3/28* (2013.01); *H02P 6/16* (2013.01);
(Continued)

(58) Field of Classification Search
CPC .................................. H02P 6/153; H02K 3/28
(Continued)

(56) References Cited

U.S. PATENT DOCUMENTS 7,095,208 B2 * 8/2006 Kawaji ................... H02P 27/08
                                                                 318/801
9,793,847 B2 * 10/2017 Iwata ........................ H02P 6/28
(Continued)

FOREIGN PATENT DOCUMENTS

| CN | 203135771 U | 8/2013 |
| CN | 103647482 A | 3/2014 |
| CN | 109873578 A | 6/2019 |

OTHER PUBLICATIONS

ISA/CN, Int. Search Report issued on PCT application No. PCT/CN2019/094242, dated Sep. 9, 2019, 2 pages.

*Primary Examiner* — David Luo
(74) *Attorney, Agent, or Firm* — Greenberg Traurig, LLP

(57) ABSTRACT

An electric tool includes a motor, a drive circuit, a power supply and a controller. The motor includes a rotor and first, second, and third phase windings. The drive circuit is electrically connected to the first, second, and third phase windings and drives the motor to output power. The power supply is electrically connected to the drive circuit and supplies power to the first, second, and third phase windings through the drive circuit. The controller is connected to the drive circuit and outputs a control signal to control the drive circuit. The controller controls the drive circuit according to a rotation position of the rotor when a voltage of the power supply is less than or equal to a preset voltage threshold so that the first, second, and third phase windings are simultaneously connected to the power supply.

13 Claims, 8 Drawing Sheets

(51) Int. Cl.
  *H02K 3/28*   (2006.01)
  *H02P 6/16*   (2016.01)
  *H02K 7/14*   (2006.01)

(52) U.S. Cl.
  CPC .......... *H02K 7/145* (2013.01); *H02P 2203/03* (2013.01)

(58) Field of Classification Search
  USPC ................................ 318/400.3, 400.01, 700
  See application file for complete search history.

(56) References Cited

U.S. PATENT DOCUMENTS 9,950,417 B2 *   4/2018   Ito .............................. B25F 5/00
2017/0047871 A1   2/2017   Maiocchi

* cited by examiner

ELECTRIC TOOL AND CONTROL METHOD OF ELECTRIC TOOL

RELATED APPLICATION INFORMATION

This application claims priority to Chinese Patent Application No. 201810699098.2, filed with the CNIPA on Jun. 29, 2018, the disclosure of which is incorporated herein by reference in its entirety.

BACKGROUND

The present application relates to an electric tool, for example, an electric tool and a control method thereof.

An electric tool includes a brushless motor and a functional accessory, where the functional accessory is driven by rotation of the brushless motor to realize a function of the functional accessory.

The brushless motor is generally formed by a motor body thereof and a corresponding drive circuit. Compared to a brush motor, the brushless motor has a lower running noise and a longer service life. Generally, brushless motors are divided into brushless motors under inductive control and brushless motors under non-inductive control, depending on whether a sensor for detecting a position of a rotor is provided. The setting of a position sensor and the cooperation between the position sensor and a control method are important factors that affect performance of the brushless motor.

Electric tools can be divided into alternating current (AC) electric tools and direct current (DC) electric tools according to different power supplies. With regard to the DC brushless electric tools, generally speaking, specifications of power supply modules that need to be adapted are different according to different output characteristics of the motors, especially for electric tools using battery packs. In some cases, if a voltage of the battery pack for supplying power is too low due to long time of use, it will lead to decrease of rotation speed of the motor, thereby failing to meet an output demand; or if there is no adaptive battery pack nearby, the electric tool is unable to complete expected work.

SUMMARY

The present application provides an electric tool and a control method thereof, which can be compatible with multi-voltage power supply and meet requirements of output characteristics.

Provided is an electric tool, including: a function member, a motor, a drive circuit, a power supply module and a control module. The motor is configured to drive the function member, and the motor includes a rotor, a first phase winding, a second phase winding and a third phase winding. The drive circuit is electrically connected to the first phase winding, the second phase winding and the third phase winding and configured to drive the motor to output power. The power supply module is electrically connected to the drive circuit and configured to supply power to the first phase winding, the second phase winding and the third phase winding through the drive circuit. The control module is connected to the drive circuit and configured to output a control signal to control the drive circuit, where the control module is configured to control the drive circuit according to a rotation position of the rotor of the motor in a case where a voltage of the power supply module is less than or equal to a preset voltage threshold, so that the first phase winding, the second phase winding and the third phase winding are simultaneously connected to the power supply module.

Provided is a control method of an electric tool. The electric tool includes a motor, and a power supply module. The motor includes a rotor, a first phase winding, a second phase winding and a third phase winding. The power supply module includes a power supply positive terminal and a power supply negative terminal, and is configured to cause a potential difference between the power supply positive terminal and the power supply negative terminal.

The control method includes the following steps. The voltage of the power supply module is obtained. A rotation position of the rotor of the motor is obtained in response to the voltage of the power supply module being less than or equal to a preset voltage threshold. In response to the rotor rotating to a first preset rotation position, the first phase winding is electrically connected to the power supply positive terminal, the second phase winding is electrically connected to the power supply negative terminal, and the third phase winding is electrically connected to one of the power supply positive terminal and the power supply negative terminal. In response to the rotor rotating to a second preset rotation position, the third phase winding is electrically disconnected from the one of the power supply positive terminal and the power supply negative terminal and electrically connected to another of the power supply positive terminal of and the power supply negative terminal.

Provided is a control method of an electric tool. The electric tool includes a motor, and a power supply module. The motor includes a rotor, a first phase winding, a second phase winding and a third phase winding. The power supply module includes a power supply positive terminal and a power supply negative terminal, where the power supply module is configured to cause a potential difference between the power supply positive terminal and the power supply negative terminal.

The control method includes the following steps.

A voltage of the power supply module is obtained.

The first phase winding, the second phase winding and the third phase winding are simultaneously connected to one of the power supply positive terminal and the power supply negative terminal in response to the voltage of the power supply module being less than or equal to a preset voltage threshold.

A rotation position of the rotor of the motor is obtained. In response to the rotor rotating to a preset position, one of the first phase winding, the second phase winding and the third phase winding is disconnected from the one of the power supply positive terminal and the power supply negative terminal and connected to another of the power supply positive terminal and the power supply negative terminal.

DETAILED DESCRIPTION

The electric tool of the present example may be a handheld electric tool, a garden tool, or a garden vehicle such as a vehicle type lawn mower, which is not limited herein. The electric tool 10 of the present example includes, but is not limited to, an electric tool requiring speed adjustment, such as a screwdriver, an electric drill, a wrench and an angle grinder; an electric tool that may be used to grind workpieces, such as a sanding machine; an electric tool that may be used to cut workpieces, such as a reciprocating saw, a circular saw, a curve saw; and an electric tool that may be used for impact, such as an electric hammer. The electric tool may also be a garden tool, such as a pruning machine, a chainsaw or a vehicle lawnmower, and the electric tool may also be used for other purposes, such as a blender.

Figure 1:
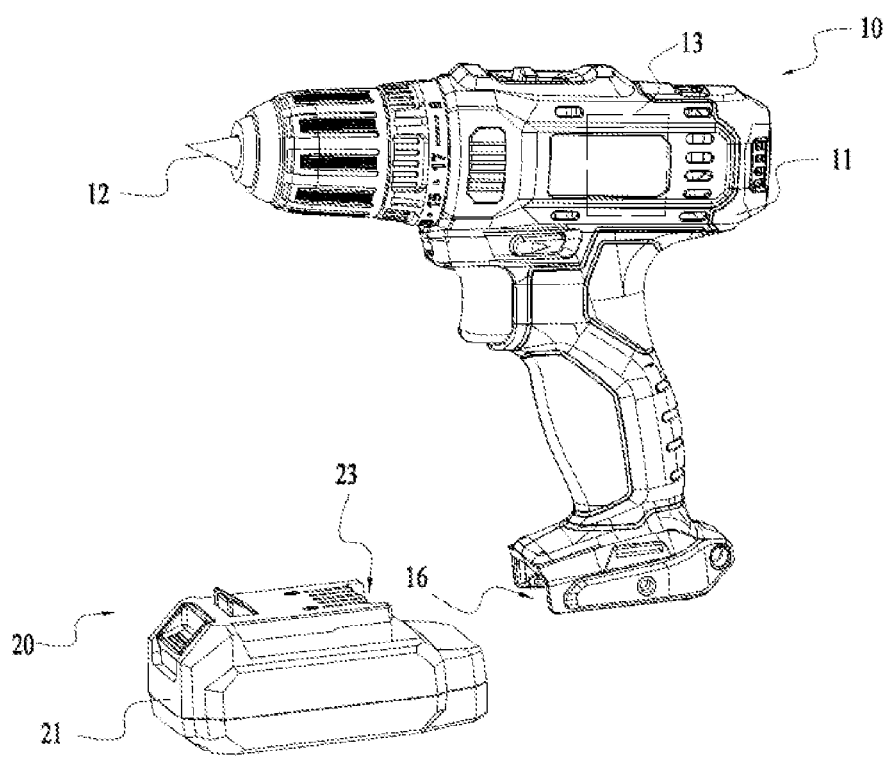
FIG. 1 is a structural diagram illustrating an electric tool according to an example provided by the present application.

Referring to FIG. 1, the electric tool 10 includes a housing 11, a function member 12 and a motor 34. The housing 11 forms a main part of the electric tool 10 and is configured to accommodate the motor 34. One end of the housing 11 is also configured to install the function member 12.

The function member 12 is configured to realize a function of the electric tool 10, such as grinding and cutting. The electric tool 10 shown in FIG. 1 takes the hand-held electric drill as an example, where the function member 12 is a drill. The function member 12 is operably connected to the motor 34, for example, through a tool accessory shaft.

Figure 3:
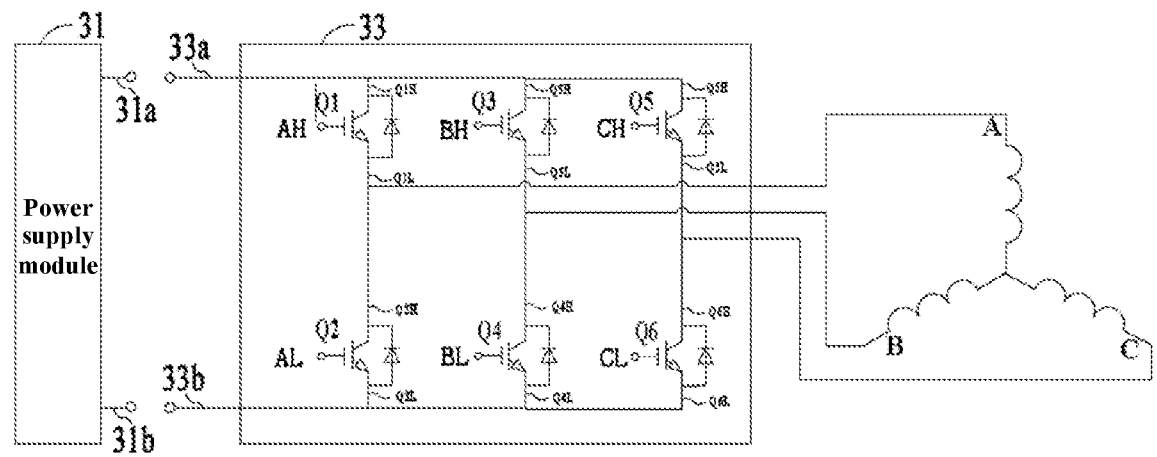
FIG. 3 is a circuit diagram illustrating a drive circuit in the electric tool.

The motor 34 is configured to drive the function member 12 so as to drive the function member 12 to operate and provide power for the function member 12. Referring to FIG. 3, the motor 34 is a brushless motor. In an example, the motor 34 includes a rotor, a first phase winding A, a second phase winding B and a third phase winding C. The motor 34 further includes a motor shaft and a stator. The motor shaft is operably connected to the function member 12. For example, the motor shaft and a tool accessory shaft supporting the function member are connected by a transmission device, so that a driving force of the motor shaft is transferred to the tool accessory shaft, so that the function member 12 installed on the tool accessory shaft operates.

The power supply module is configured to provide power for the electric tool 10. In the present example, the electric tool 10 is powered by a DC power supply. In another example, the electric tool 10 is powered by a battery pack 20. The electric tool 10 includes a battery package connection interface 16 or an accommodating portion configured to accommodate the battery pack 20. The battery package connection interface 16 is configured to accommodate the battery packs 20 with different voltages, or to connect the battery packs 20 with different voltages. The battery pack 20 includes a battery 22 and a housing 21. The battery 22 is accommodated in the housing 21, configured to store energy and can be charged and discharged repeatedly. The housing 21 is configured to accommodate the battery 22 and other components in the battery pack 20, and the housing is formed with a bonding portion 23. In the present example, the battery pack 20 is applicable to the electric tool 10 and can be used as a power source of the electric tool 10. The battery pack 20 further includes a plurality of electrode connection terminals that at least enable the battery 22 to be electrically connected to an external circuit.

In an example, the electric tool 10 may be powered by a plurality of battery packs 20. In an example, the electric tool 10 may be powered by only one battery pack 20. A number of battery packs 20 used by the electric tool 10 is not limited herein.

Figure 2:
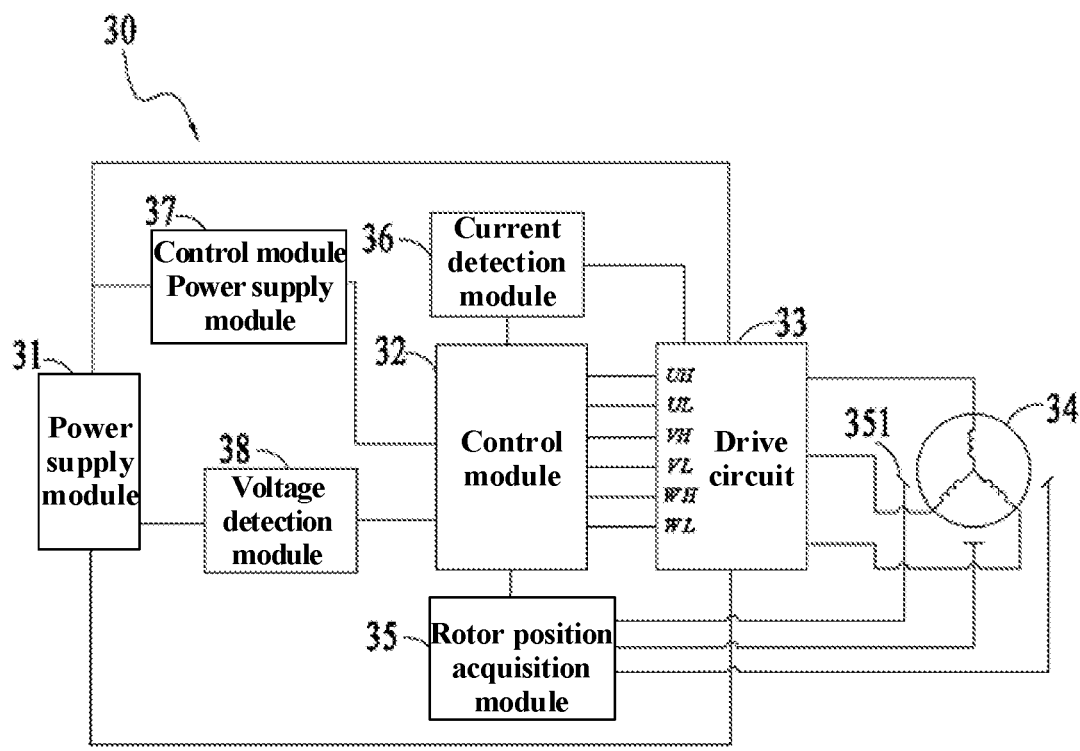
FIG. 2 is a circuit block diagram illustrating a motor driving system of the electric tool shown in FIG. 1.

Operation of the electric tool 10 also depends on a circuit system. Referring to FIG. 2, in an example, a motor driving system 30 of the electric tool includes a power supply module 31, a control module 32, a drive circuit 33 and a motor 34. The power supply module 31 is configured to provide power for the electric tool 10. As illustrated in FIG. 3, the power supply module 31 includes a power supply positive terminal 31a and the power supply negative terminal 31b. The power supply positive terminal 31a is a power supply terminal of the power supply module 31, and the power supply negative terminal 31b is a power supply negative terminal of the power supply module 31. In the power supply module 31, a potential difference is generated between the power supply positive terminal 31a and the power supply negative terminal 31b. In the present example, the battery pack 20 is used as the power supply module 31. In other examples, the power supply module 31 may also be an AC power supply and circuits such as a rectifier circuit and a filter circuit. The power supply module 31 is electrically connected to the drive circuit 33 and supplies power to the motor 34 through the drive circuit. Referring to FIG. 3, the power supply module 31 supplies power to the first phase winding A, the second phase winding B, and the third phase winding C of the motor 34 through the drive circuit 33.

In an example, as illustrated in FIG. 2, the electric tool 10 further includes a control module power supply circuit 37. The control module power supply circuit 37 is electrically connected to the power supply module 31 and the control module 32 and converts electrical energy from the power supply module 31 into electrical energy for the control module 32 to use. The control module 32 is electrically connected to the drive circuit 33 so as to output a drive signal to control the drive circuit 33 to operate. In some examples, the control module 32 adopts a dedicated control core, e.g., a Microcontroller Unit (MCU). A power drive unit (not shown) is provided inside a control chip 32. The power drive unit is used to improve driving ability of the output signal of the control module 32. The power drive unit can also be implemented by an external power drive unit.

The drive circuit 33 is connected to the motor 34 so as to drive the motor 34 to operate. The motor 34 may be a brushless motor or a brush motor. The solution of the present application is illustrated with motor 34 as an example. Referring to FIG. 3, in an example, the motor 34 includes multiphase windings. In an example, the motor 34 includes a first phase winding A, a second phase winding B and a third phase winding C. The drive circuit 33 is electrically connected to the first phase winding, the second phase winding and the third phase winding of the motor 34, and configured to drive the motor 34 to output power. The drive circuit 33 includes a first drive terminal 33a and a second drive terminal 33b. The first drive terminal 33a is used to be electrically connected to the power supply positive terminal 31a of the power supply module 31. The second drive terminal 33b is configured to be electrically connected to the power supply negative terminal 31b of the power supply module 31. The drive circuit 33 further includes a drive switch, and the drive switch includes a plurality of high-side switches and a plurality of low-side switches. High-side terminals of the high-side switches are electrically connected to the first drive terminal 33a, respectively. Low-side terminals of the low-side switches are electrically connected to the second drive terminal 33b, respectively.

The power supply module 31 is electrically connected to the drive circuit 33 and configured to supply power to the first phase winding A, the second phase winding B and the third phase winding C of the motor through the drive circuit 33.

In an example, as illustrated in FIG. 3, the drive switch includes a plurality of high-side switches and a plurality of low-side switches. The plurality of high-side switches refer to a high-side switch Q1, a high-side switch Q3 and a high-side switch Q5 in FIG. 3. The plurality of high-side switches each have a high-side terminal and a low-side terminal. The high-side switch Q1 has a high-side terminal Q1H and a low-side terminal Q1L. The high-side switch Q3 has a high-side terminal Q3H and a low-side terminal Q3L. The high-side switch Q5 has a high-side terminal Q5H and a low-side terminal Q5L. The high-side terminal Q1H of the high-side switch Q1, the high-side terminal Q3H of the high-side switch Q3, and the high-side terminal Q5H of the high-side switch Q5 are respectively connected to the first drive terminal 33a of the drive circuit 33.

In an example, as illustrated in FIG. 3, the plurality of low-side switches refer to a low-side switch Q2, a low-side switch Q4 and a low-side switch Q6 in FIG. 3. The plurality of low-side switches also each have a high-side terminal and a low-side terminal. The low-side switch Q2 has a high-side terminal Q2H and a low-side terminal Q2L. The low-side switch Q4 has a high-side terminal Q4H and a low-side terminal Q4L. The low-side switch Q6 has a high-side terminal Q6H and a low-side terminal Q6L. The low-side terminal Q2L of the low-side switch Q2, the low-side terminal Q4L of the low-side switch Q4, and the low-side terminal Q6L of the low-side switch Q6 are respectively connected to the second drive terminal 33b of the drive circuit 33.

The low-side terminal Q1L of the high-side switch Q1 is connected to the high-side terminal Q2H of the low-side switch Q2. The low-side terminal Q3L of the high-side switch Q3 is connected to the high-side terminal Q4H of the low-side switch Q4. The low-side terminal Q5L of the high-side switch Q5 is connected to the high-side terminal Q6H of the low-side switch Q6.

In an example, the low-side terminal Q1L of the high-side switch Q1 and the high-side terminal Q2H of the low-side switch Q2 are both connected to the first phase winding A, the low-side terminal Q3L of the high-side switch Q3 and the high-side terminal Q4H of the low-side switch Q4 are both connected to the second phase winding B, and the low-side terminal Q5L of the high-side switch Q51 and the high-side terminal Q6H of the low-side switch Q6 are both connected to the third phase winding C. The three-phase windings of the motor 34 are connected to the power supply module 31 through a bridge formed of the plurality of high-side switches (the high-side switch Q1, the high-side switch Q3, and the high-side switch Q5) and the plurality of low-side switches (the low-side switch Q2, the low-side switch Q4, and the low-side switch Q5). The above-mentioned high-side switches and the low-side switches may be semiconductor devices, such as a metal oxide semiconductor field effect transistor (MOSFET) or an insulated gate bipolar transistor (IGBT). The high-side switches and the low-side switches each are connected in parallel with a parasitic diode. AH, AL, BH, BL, CH, and CL refer to a control terminal of the high-side switch Q1, a control terminal of the low-side switch Q2, a control terminal of the high-side switch Q3, a control terminal of the low-side switch Q4, a control terminal of the high-side switch Q5, a control terminal of and the low-side switch Q6, respectively.

The control terminals AH, AL, BH, BL, CH and CL of the respective drive switches are electrically connected to the control module 32, respectively. The high-side switches Q1 to Q6 is configured to change a turned-on state according to a control signal output by the control module 32, thereby changing a voltage state loaded by the power supply module 31 on the windings of the brushless motor 34.

In the present example, the high-side switch Q1 is configured to turn on or turn off an electrical connection between the first phase winding A and the power supply positive terminal 31a of the power supply module 31. The high-side switch Q3 is configured to turn on or turn off an electrical connection between the second phase winding B and the power supply positive terminal 31a of the power supply module 31. The high-side switch Q5 is configured to turn on or turn off an electrical connection between the third phase winding C and the power supply positive terminal 31a of the power supply module 31. The low-side switch Q2 is configured to turn on or turn off an electrical connection between the first phase winding A and the power supply negative terminal 31b of the power supply module 31. The low-side switch Q4 is configured to turn on or turn off an electrical connection between the second phase winding B and the power supply negative terminal 31b of the power supply module 31. The low-side switch Q6 is configured to turn on or turn off an electrical connection between the third phase winding C and the power supply negative terminal 31b of the power supply module 31. In a case where a winding is connected to the power supply negative terminal 31b, a voltage of the winding is a negative voltage, while in a case where the winding is connected to the power supply positive terminal 31a, a voltage of the winding is a positive voltage.

In an example, the electric tool 10 further includes a rotor position acquisition module 35. The rotor position acquisition module 35 is connected to the motor 34 and the control module 32 and configured to acquire a position of the rotor in the motor 34. In a case where the rotor rotates into a preset range, the rotor position acquisition module 35 is in one signal state, and in a case where the rotor rotates out of the preset range, the rotor position acquisition module 35 switches to another signal state. In some examples, the rotor position acquisition module 35 includes a position sensor 351 (e.g., a Hall sensor). In other examples, the rotor position acquisition module 35 does not include the position sensor 351, but determines the rotor position and performs phase commutation according to a back electromotive force signal.

In the present example, the rotor position acquisition module 35 includes the position sensor 351, and the position sensor 351 is three Hall sensors. As illustrated in FIG. 2, the three Hall sensors are provided along a circumferential direction of the rotor of the motor 34, and rotor position information detected by the Hall sensor is input to the rotor position acquisition module 35. The rotor position acquisition module 35 converts the input rotor position information into rotor position information that is capable of communicating with the control module 32 through logical processing and inputs the rotor position information that is capable of communicating with the control module 32 to the control module 32. In a case where the rotor rotates into and out of the preset range, a signal of the Hall sensor changes, and an output signal of the rotor position acquisition module 35 changes correspondingly.

In a case where the rotor rotates into the preset range, the output signal of the rotor position acquisition module 35 is defined as 1, while in a case where the rotor rotates out of the preset range, the output signal of the rotor position acquisition module 35 is defined as 0. The three Hall sensors are separated from each other by a physical angle of 120°.

Figure 4:
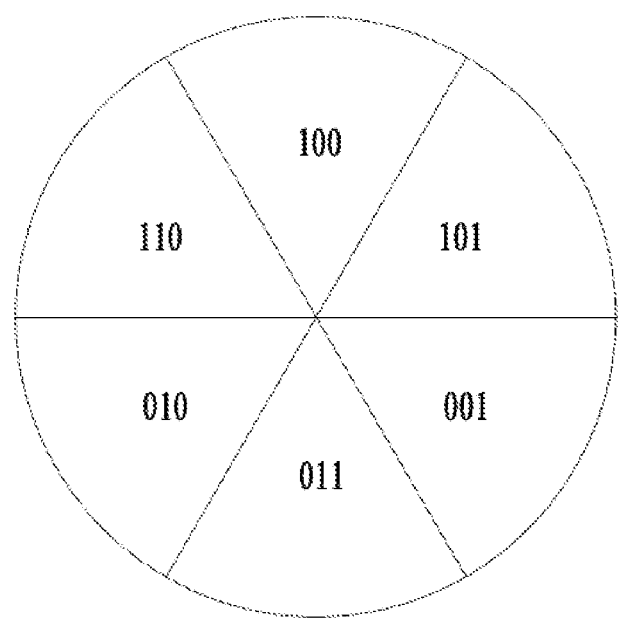
FIG. 4 is a diagram illustrating a corresponding relationship between a signal and a signal interval of a position sensor in the electric tool.

Referring to FIG. 4, when the rotor rotates, the three Hall sensors are configured to generate one of six position signal combinations so that the rotor position acquisition module 35 outputs the one of six position signal combinations. If arranged in an order in which the Hall sensors are placed, six different position signal combinations: 100, 110, 010, 011, 001 and 101 are provided. In this way, the rotor position acquisition module 35 is capable of outputting one of the above six position signal combinations, and the position of the rotor can be known according to a position signal output by the rotor position acquisition module 35.

The motor 34 with three-phase windings has six driving states in one power-on cycle corresponding to the output signals generated in the above solution. Therefore, when the output signal from the rotor position acquisition module 35 changes, the motor 34 performs one commutation.

In order to rotate the motor 34, the drive circuit 33 is provided with a plurality of driving states. In one driving state, the stator winding of the motor 34 generates a magnetic field. The controller module 32 controls the drive circuit 33 to switch the driving state to rotate the magnetic field generated by the stator winding so as to drive the rotor to rotate, thereby driving the motor 34.

In order to drive the motor 34, the drive circuit 33 has at least six driving states. For ease of description, a connected connecting terminal corresponding to a driving state is used to indicate the driving state below. For example, if the control module 32 controls the drive circuit 33 to connect the first phase winding A to the power supply positive terminal 31a of the power supply module 31 and connect the second phase winding B to the power supply negative terminal 31b of the power supply module 31, the driving state is indicated by AB, in which the first phase winding A and the second phase winding B are turned on, which is referred to as AB phase turned on. If the control module 32 controls the drive circuit 33 to connect the first phase winding A to the power supply negative terminal 31b of the power supply module 31 and connect the second phase winding B to a first power supply negative terminal 31b of the power supply module 31, the driving state is indicated by BA, in which the first phase winding A and the second phase winding B are turned on, which is referred to as BA phase turned on, where a current direction thereof is opposite to that of the AB phase turned on. A driving manner shown in this way is also applicable to a triangular connection solution of windings. In addition, switching between driving states may also be simply referred to as direction commutation of the motor 34. Apparently, the motor 34 commutes once every time the rotor rotates at an electrical angle of 60°. An interval between one direction commutation and a next direction commutation of the motor 34 is defined as a direction commutation interval.

FIG. 5 illustrates a control method for the brushless motor in the related art. In one cycle, when the brushless motor operates normally, the control module 32 controls the drive circuit 33 so that the drive circuit 33 sequentially outputs six driving states, that is, AB, AC, BC, BA, CA and CB, during driving. In an example, the three Hall sensors detect the position of the rotor, and the rotor position acquisition module 35 receives and sends detection signals from the three Hall sensors to the control module 32 after processing. The control module 32 controls the drive circuit 33 and causes the drive circuit sequentially to output six driving states, that is, AB, AC, BC, BA, CA and CB, during driving according to a received output signal from the rotor position acquisition module 35.

Figure 5A:
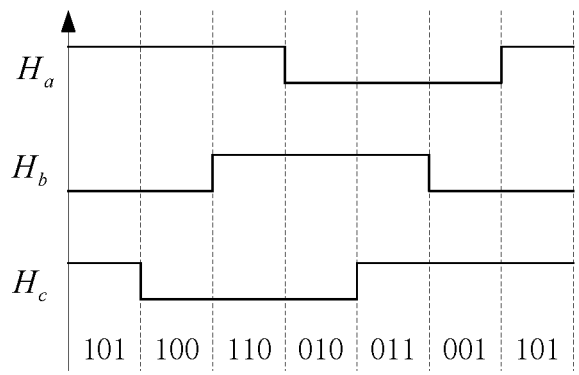
FIGS. 5A, 5B, and 5C illustrate a control method of a brushless motor in the electric tool in the related art.
Figure 5B:
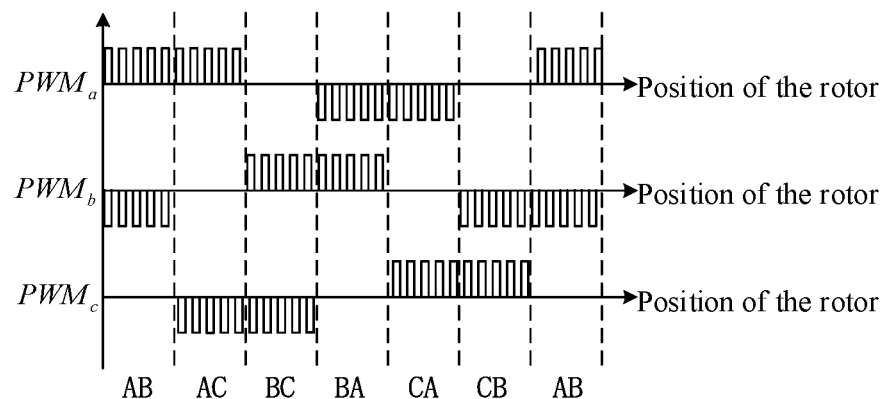
Figure 5C:
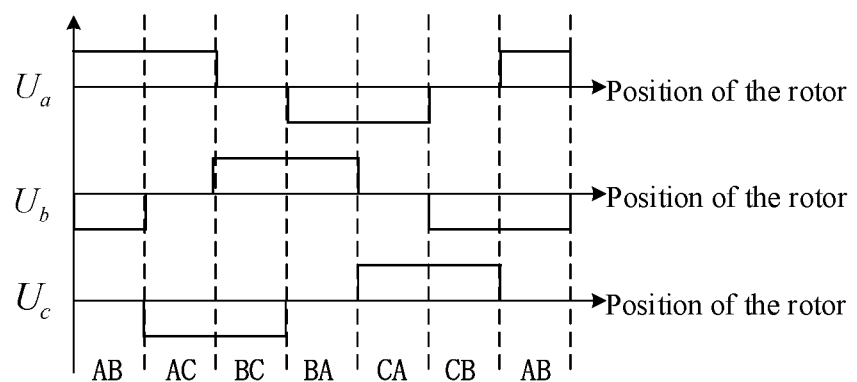

As illustrated in FIG. 5A-C, Ha, Hb and Hc refer to output signals from the rotor position acquisition module 35, and correspond to detection signals of the three Hall sensors, respectively. PWMa, PWMb and PWMc refer to a series of pulse signals with a constant duty cycle sent by the control module 32 to the drive switch. Ua, Ub, Uc refer to voltages between the first phase winding A and a neutral point O, between the second phase winding B and the neutral point O, and between the third phase winding C and the neutral point O.

PWMa refers to a pulse signal sent by the control module 32 to the control terminal AH of the high-side switch Q1 and the control terminal AL of the low-side switch Q2, so as to conduct electrical connection between the first phase winding A and the power supply positive terminal 31a or the power supply negative terminal 31b. When the PWMa signal is a positive pulse signal, the control terminal AH of the high-side switch Q1 receives the positive pulse signal, and the high-side switch Q1 conducts the electrical connection between the first phase winding A and the power supply positive terminal 31a at a preset duty cycle. When the PWMa signal is a negative pulse signal, the low-side switch Q2 conducts the electrical connection between the first phase winding A and the power supply negative terminal 31b at a preset duty cycle. Similarly, PWMb refers to a pulse signal sent by the control module 32 to the control terminal BH of the high-side switch Q3 and the control terminal BL of the low-side switch Q4. When the PWMb signal is a positive pulse signal, the control terminal BH of the high-side switch Q3 receives the positive pulse signal, the high-side switch Q3 conducts the electrical connection between the second phase winding B and the power supply positive terminal 31*a* at a preset duty cycle. When the PWMb signal is a negative pulse signal, the control terminal BL of the low-side switch Q4 receives the negative pulse signal, and the low-side switch Q4 conducts the electrical connection between the second phase winding B and the power supply negative terminal 31*b* at a preset duty cycle. PWMc refers to a pulse signal sent by the control module 32 to the control terminal CH of the high-side switch Q5 and the control terminal CL of the low-side switch Q6. When the PWMc signal is a positive pulse signal, the control terminal CH of the high-side switch Q5 receives the positive pulse signal, the high-side switch Q5 conducts the electrical connection between the third phase winding C and the power supply positive terminal 31*a* at a preset duty cycle. When the PWMc signal is a negative pulse signal, the control terminal CL of the low-side switch Q6 receives the negative pulse signal, and the low-side switch Q6 conducts the electrical connection between the third phase winding C and the power supply negative terminal 31*b* at a preset duty cycle. When interval rotor position or interval time between a continuous plurality of pulse signals of a PWM signal is small enough, in a continuous pulse signal interval, the drive switch equivalently maintains the turned-on state.

In brushless motor control technology of the electric tool in the related art, a corresponding relationship between the driving state and the output signal from the rotor position acquisition module 35 is shown below in Table 1.

TABLE 1

| Signal combination | Driving state |
|---|---|
| 101 | AB |
| 100 | AC |
| 110 | BC |
| 010 | BA |
| 011 | CA |
| 001 | CB |

According to such correspondence, when detecting a signal change of the rotor position acquisition module 35, the control module 32 controls the drive circuit 33 to switch the driving state.

Referring to FIG. 5C, in this manner, continuous conduction time of each phase winding (i.e., time that the control module 32 controls the drive circuit 33 to continuously conduct the electrical connection between the winding and the power supply module 31) is 120°, and voltage of each phase winding does not continuously change.

When a rotation speed of the motor increases, a back electromotive force increases with the increase of the rotation speed of the motor. When the rotation speed of the motor approaches a rated rotation speed, the back electromotive force may be greater than a maximum voltage that the power supply module 31 and the drive circuit 33 can supply. The power supply module 31 and the drive circuit 33 cannot supply more energy to overcome the increasing back electromotive force, so that the winding of the motor cannot obtain sufficient current to overcome a torque resistance, resulting in increasing of the rotation speed of the motor stagnating. In particular, when the voltage of the power supply module 31 is relatively low, the rotation speed and the power of the motor 34 decrease, and output requirements of the electric tool cannot be met even more.

In order to overcome the increasing back electromotive force at a relative high rotation speed of the motor, or when a maximum output rotation speed of the motor 34 is reached but a demand for the rotation speed of the motor 34 continues to increase, an excitation of the rotor can be controlled by controlling a phase angle of a phase current. Compared to the advanced phase current of the increasing back electromotive force, magnetic flux generated by a permanent magnet is reduced, thereby reducing the back electromotive force generated by the permanent magnet.

However, when the motor 34 is in a heavy load state, a current of the stator winding is relatively large, which will cause serious armature reaction, resulting in phase advance and angle reduction of the phase current and even lag behind the magnetic field of the rotor, thereby failing to achieve an effect of speed increase. In practice, due to delay of the control, when the rotor rotates to a position where the driving state needs to be switched, it is often too late to perform the control, which affects performance of the brushless motor.

To eliminate the delay as much as possible and enable the phase commutation to correspond to the position of the rotor, it is feasible to adopt a control method of starting phase commutation advanced from an actual position of the rotor. A physical position of the Hall sensor can be set by a certain angle ahead of an ideal position. For example, the Hall sensors are disposed at a position advanced by an electrical angle of 20° to 40° from the ideal position or advanced by a physical angle of 20°/P to 40°/P from the ideal positions. P denotes a number of pole pairs of the rotor of the motor 34. However, when the motor 34 is in the heavy load state, the armature reaction of the motor causes position advance and angle reduction of the Hall sensor and even lag behind the rotor magnetic field, thereby failing to achieve the effect of speed increase.

In addition, when the voltage of the power supply module 31 is relatively low, the rotation speed and the power of the motor 34 will decrease, which cannot meet the output requirements of the electric tool 10. For example, for the electric tool 10 using the battery pack 20 as the power supply module 31, in some cases, if the voltage of the battery pack 20 for supplying power is relative low due to long time of use, at this moment, when the battery pack 20 with the relatively low voltage is connected to the electric tool 10, the rotation speed and the power of the motor 34 decrease, which cannot meet the output requirements of the electric tool 10. Or when there is no battery pack 20 with high voltage nearby to adapt to the electric tool 10, and only the battery pack 20 with a relatively low voltage can be connected to the electric tool 10, the electric tool 10 cannot complete expected work due to decrease in the rotation speed and the power of the motor 34.

The present example provides an electric tool compatible with multi-voltage power supply and a control method for the electric tool, so that the electric tool 10 can be compatible with multi-voltage power supply modules and can meet the requirements of output characteristics.

In the present application, the control module 32 is configured to control the drive circuit 33 according to a rotation position of the rotor of the motor 34 in a case where the voltage of the power supply module 31 is less than a preset voltage threshold, so that the first phase winding A, the second phase winding B and the third phase winding C of the motor 34 are simultaneously connected to the power supply module 31.

In some examples, the electric tool 10 includes a voltage detection module 38 configured to detect the voltage of the power supply module 31. The voltage detection module 38 is connected to the control module 32, and the control module 32 is capable of determining whether the voltage of the power supply module 31 is less than the preset voltage threshold according to a detection signal of the voltage detection module 38.

In some examples, the electric tool 10 includes a current detection module 36 configured to detect current of the motor 34. The current detection module 36 is connected to the control module 32, and the control module 32 is capable of determining whether the voltage of the power supply module 31 is less than the preset voltage threshold according to a detection signal of the current detection module 36.

In other examples, the control module 32 may also determine whether the voltage of the power supply module 31 is less than or equal to the preset voltage threshold according to the rotation speed of the motor detected by a rotor rotation speed detection module (not shown). In an example, when the rotation speed of the motor 34 is less than a preset threshold, the control module 32 determines that the voltage of the power supply module 31 is less than or equal to the preset voltage threshold. In other examples, the control module 32 may also determine whether the voltage of the power supply module 31 is less than or equal to the preset voltage threshold according to a back electromotive force of the windings of the motor 34 detected by a back electromotive force measuring module (not shown). When the back electromotive force of the motor 34 meets a preset condition, the control module 32 determines that the voltage of the power supply module 31 is less than or equal to the preset voltage threshold.

In some examples, the preset voltage threshold is 0.4 to 0.8 times a rated voltage of the electric tool. In an example, the preset voltage threshold is 0.5 to 0.75 times the rated voltage of the electric tool. That is, if the voltage of the power supply module 31 is less than 0.5 to 0.75 times the rated voltage of the electric tool 10, the control module 32 determines that the power supply module 31 is a power supply with low voltage. At this moment, the control module 32 controls the drive circuit 33 according to the rotation position of the rotor of the motor 34 so that the first phase winding A, the second phase winding B and the third phase winding C are simultaneously connected to the power supply module 31. Taking a DC-powered electric tool with a rated voltage of 48V as an example, when the voltage of the power supply module 31 acquired by the control module 32 is in a range of 24V to 36V, the control module 32 determines that the power supply module 31 is a power supply with low voltage. At this moment, the control module 32 controls the drive circuit 33 according to the rotation position of the rotor of the motor 34 so that the first phase winding A, the second phase winding B and the third phase winding C are simultaneously connected to the power supply module 31. While, when the voltage of the power supply module 31 is greater than the preset voltage threshold, the control module 31 still adopts a control manner in the related art (FIG. 5). That is, the control module 32 selects different control manners according to different ranges in which the voltage of the power supply module 31 is and controls the drive circuit 33 to simultaneously connect the first phase winding A, the second phase winding B, and the third phase winding C to the power supply module 31 when the power supply module 31 is a power supply with low voltage. By such manner, when using the power supply module 31 with low voltage whose voltage is lower than the preset voltage threshold, the electric tool is also possible to output a rotation speed and power of the motor approximately similar to that of the power supply module 31 with high voltage whose voltage is higher than the preset voltage threshold.

In the present example, after determining that the voltage of the power supply module 31 is less than or equal to the preset voltage threshold, the control module 32 is configured to control the drive circuit 33 to simultaneously connect the first phase winding A, the second phase winding B, and the third phase winding C to the power supply module 31 according to the position of the rotor. In an example, the voltage of the power supply module 31 is greater than or equal to 0.2 times the rated voltage of the electric tool 10. In an example, the voltage of the power supply module 31 is greater than or equal to 0.3 times the rated voltage of the electric tool 10, so as to prevent the battery pack from being damaged due to use at a relatively low voltage, and to prevent the voltage of the battery pack from being too low to meet the output requirements of the electric tool.

In an example, when the rotor rotates to a first preset rotation position, the drive circuit 33 is controlled so that the first phase winding is electrically connected to the power supply positive terminal 31a, the second phase winding is electrically connected to the power supply negative terminal 31b, and the third phase winding is electrically connected to one of the power supply positive terminal 31a and the power supply negative terminal 31b. When the rotor rotates to the second preset rotation position, the drive circuit 33 is controlled so that the third phase winding is electrically disconnected from the one of the power supply positive terminal 31a and the power supply negative terminal 31b and electrically connected to the other one of the power supply positive terminal 31a and the power supply negative terminal 31b. It should be noted that the first phase winding, the second phase winding, and the third phase winding are not limited to one-to-one correspondence with the first phase winding A, the second phase winding B, and the third phase winding C.

Hereinafter, description will be given by taking the first phase winding corresponding to the first phase winding A, the second phase winding corresponding to the second phase winding B, and the third phase winding corresponding to the third phase winding C as an example.

Figure 6A:
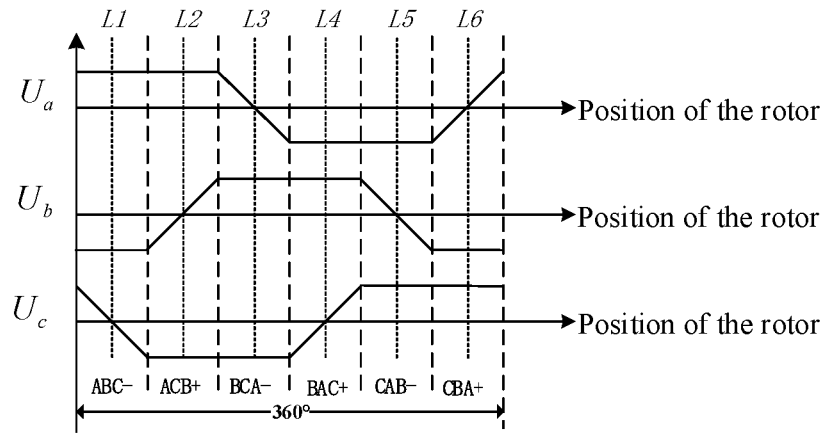
FIGS. 6A, 6B and 6C are graphs illustrating corresponding relationships between a voltage of each phase and a position of a rotor of a brushless motor in different examples.
Figure 6B:
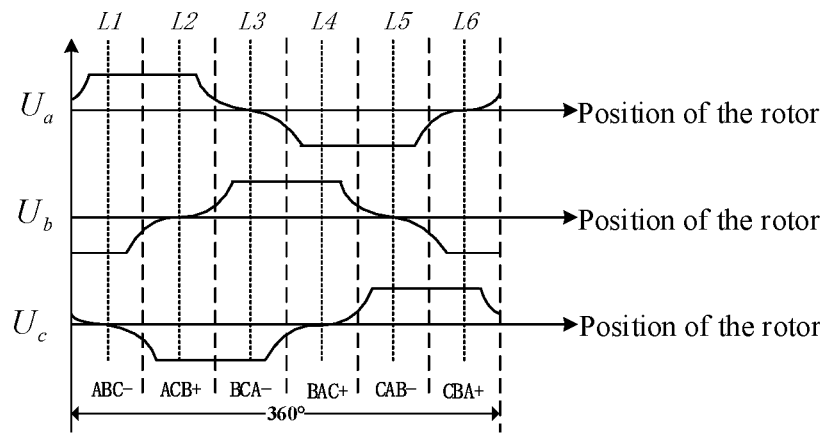
Figure 6C:
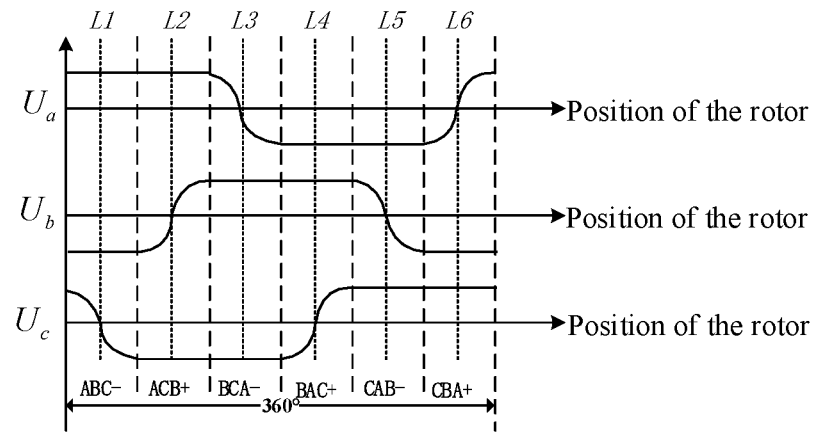

Referring to FIGS. 6A, 6B and 6C, the control module 31 of three different implementation manners controls the drive circuit 33 according to the rotation position of the rotor so that the first phase winding A, the second phase winding B and the third phase winding C are simultaneously connected to the power supply module 31.

In the implementation manners illustrated in FIGS. 6A, 6B and 6C, during one of the cycles that the rotor has rotated, the control module 32 is configured to control the drive circuit 33 when the rotor rotates to the first preset rotation position (a zero-position), where the zero-position is taken as the first preset rotation position, so that the first phase winding (the first phase winding A) is electrically connected to the power supply positive terminal 31a of the power supply module 31, the second phase winding (the second phase winding B) is electrically connected to the power supply negative terminal 31b, and the third phase winding (the third phase winding C) is electrically connected to one of the power supply positive terminal 31a and the power supply negative terminal 31b. In the implementation manners illustrated in FIGS. 6A, 6B and 6C, when the rotor rotates to the first preset rotation position (the zero-position), the third phase winding (the third phase winding C) is electrically connected to the power supply positive terminal 31a.

When the rotor rotates to the second preset rotation position (L1), the control module 32 is configured to control the drive circuit 33 so that the third phase winding (the third phase winding C) is electrically disconnected from the one of the power supply positive terminal 31*a* and the power supply negative terminal 31*b* and electrically connected to the other one of the power supply positive terminal 31*a* and the power supply negative terminal 31*b*. In the implementation manners illustrated in FIGS. 6A, 6B and 6C, when the rotor rotates to the second preset rotation position (L1), the third phase winding (the third phase winding C) is electrically disconnected from the power supply positive terminal 31*a* and electrically connected to the power supply negative terminal 31*b*.

When the rotor rotates to the third preset rotation position (L2), the control module 32 controls the drive circuit 33 so that the first phase winding (the first phase winding A) is electrically disconnected from the power supply positive terminal 31*a* and electrically connected to the power supply negative terminal 31*b* or the second phase winding (the second phase winding B) is electrically disconnected from the power supply negative terminal 31*b* and electrically connected to the power supply positive terminal 31*a*. In the implementation manners illustrated in FIGS. 6A, 6B and 6C, when the rotor rotates to the third preset rotation position (L2), the control module 32 controls the drive circuit 33 so that the second phase winding (the second phase winding B) is electrically disconnected from the power supply negative terminal 31*b* and electrically connected to the power supply positive terminal 31*a*.

When the rotor is located between the first preset rotation position (the zero-position) and the second preset rotation position (L1), the control module 32 is configured to control the drive circuit 33 so that a voltage of the third phase winding (the third phase winding C) at least partially varies with the rotation position of the rotor at a preset rate of change. It should be noted that the rate of change in the present example refers to the speed of change.

In the implementation manner illustrated in FIG. 6A, when the rotor is located between the first preset rotation position (the zero-position) and the second preset rotation position (L1), the control module 32 controls the drive circuit 33 to keep the rate of change of the voltage (Uc) of the third phase winding (the third phase winding C) constant, while the voltage (Uc) of the third phase winding (the third phase winding C) changes in magnitude, and gradually decreases from a positive maximum value at the first preset rotation position (the zero-position) to a zero value at the second preset rotation position (L1) at a preset rate of change.

In the implementation manners illustrated in FIGS. 6B and 6C, when the rotor is located between the first preset rotation position (the zero-position) and the second preset rotation position (L1), the control module 32 is configured to control the drive circuit 33 so that the voltage (Uc) of the third phase winding (the third phase winding C) varies with the rotation position of the rotor at a changing rate of change.

As illustrated in FIG. 6B, when the rotor is located between the first preset rotation position (the zero-position) and the second preset rotation position (L1), the control module 32 is configured to control the drive circuit 33 so that the voltage (Uc) of the third phase winding (the third phase winding C) varies with the rotation position of the rotor at a gradually decreasing rate of change. The rate of change of the voltage (Uc) of the third phase winding (the third phase winding C) gradually decreases, and the magnitude of the voltage (Uc) of the third phase winding (the third phase winding C) gradually decreases from the positive maximum value at the first preset rotation position (the zero-position) to the zero value at the second preset rotation position (L1).

As illustrated in FIG. 6C, when the rotor is located between the first preset rotation position (the zero-position) and the second preset rotation position (L1), the control module 32 is configured to control the drive circuit 33 so that the voltage (Uc) of the third phase winding (the third phase winding C) varies with the rotation position of the rotor at a gradually increasing rate of change. The rate of change of the voltage (Uc) of the third phase winding (the third phase winding C) gradually increases, and the magnitude of the voltage (Uc) of the third phase winding (the third phase winding C) gradually decreases from the positive maximum value at the first preset rotation position (the zero-position) to the zero value at the second preset rotation position (L1).

When the rotor is located between the second preset rotation position (L1) and the third preset rotation position (L2), the control module 32 controls the drive circuit 33 to implement in the following manners.

In the implementation manner illustrated in FIG. 6A, when the rotor is located between the second preset rotation position (L1) and the third preset rotation position (L2), the control module 32 controls the drive circuit 33 so that the voltage (Uc) of the third phase winding (the third phase winding C) first varies with the rotation position of the rotor at a preset rate of change within a preset period of time, and then maintains the constant voltage (Uc) after reaching the maximum negative voltage until the rotor rotates to the third preset rotation position (L2). In the present example, the preset period of time refers to time for the rotor to rotate at an electrical angle of 30°.

In the implementation manners illustrated in FIGS. 6A and 6B, when the rotor is located between the first preset rotation position (L1) and the second preset rotation position (L2), the control module 32 controls the drive circuit 33 so that the voltage (Uc) of the third phase winding (the third phase winding C) at least partially varies at one of the gradually increasing rate of change and the gradually decreasing rate of change with the rotation position of the rotor. When the rotor is located between the second preset rotation position (L1) and the third preset rotation position (L2), the control module 32 controls the drive circuit 33 so that the voltage (Uc) of the third phase winding (the third phase winding C) at least partially varies at the other one of the gradually increasing rate of change and the gradually decreasing rate of change with the rotation position of the rotor.

As illustrated in FIG. 6B, when the rotor is located between the first preset rotation position (L1) and the second preset rotation position (L2), the control module 32 controls the drive circuit 33 so that the voltage (Uc) of the third phase winding (the third phase winding C) varies at the gradually decreasing rate of change with the rotation position of the rotor. When the rotor is located between the second preset rotation position (L1) and the third preset rotation position (L2), the control module 32 controls the drive circuit 33 so that the voltage (Uc) of the third phase winding (the third phase winding C) first varies at the gradually increasing rate of change with the rotation position of the rotor, the rate of change of the voltage (Uc) of the third phase winding (the third phase winding C) gradually increases, and the magnitude of the voltage (Uc) of the third phase winding (the third phase winding C) gradually increases from the zero value at the second preset rotation position (L1) to the negative maximum value, and keeps unchanged when the voltage (Uc) of the third phase winding (the third phase winding C) reaches the negative maximum value until the rotor rotates to the third preset rotation position (L2).

As illustrated in FIG. 6C, when the rotor is located between the first preset rotation position (L1) and the second preset rotation position (L2), the control module 32 controls the drive circuit 33 so that the voltage (Uc) of the third phase winding (the third phase winding C) varies at the gradually increasing rate of change with the rotation position of the rotor. When the rotor is located in a position between the second preset rotation position (L1) and the third preset rotation position (L2), the control module 32 controls the drive circuit 33 so that the voltage (Uc) of the third phase winding (the third phase winding C) first varies with the gradually decreasing rate of change with the rotation position of the rotor, the rate of change of the voltage (Uc) of the third phase winding (the third phase winding C) gradually decreases, and the magnitude of the voltage (Uc) of the third phase winding (the third phase winding C) gradually increases from the zero value of the second preset rotation position (L1) to the negative maximum value, and keeps unchanged when the voltage (Uc) of the third phase winding (the third phase winding C) reaches the negative maximum value until the rotor rotates to the third preset rotation position (L2).

In other word, when the rotor is located between the second preset rotation position (L1) and the third preset rotation position (L2), the control module 32 is configured to control the drive circuit 33 so that the voltage (Uc) of the third phase winding (third phase winding C) at least partially maintains unchanged.

The above-mentioned implementation manners are only one position interval in one cycle, and the control manner of the control module 32 in other position intervals in one cycle is similar to that of the above-described implementation manners. Hereinafter, description will be given by taking the first phase winding, the second phase winding, and the third phase winding not corresponding to the first phase winding A, the second phase winding B and the third phase winding C, and the rotor position being in another position interval in the above cycle, as an example.

Taking L1 as the first preset rotation position, when the rotor rotates to the first preset rotation position (L1), the control module 32 controls the drive circuit 33 so that the first phase winding (the first phase winding A) is electrically connected to the power supply positive terminal 31a of the power supply module 31, the second phase winding (the third phase winding C) is electrically connected to the power supply negative terminal 31b, and the third phase winding (the second phase winding B) is electrically connected to one of the power supply positive terminal 31a and the power supply negative terminal 31b. In FIGS. 6A, 6B and 6C, when the rotor rotates to the first preset rotation position (L1), the control module 32 controls the drive circuit 33 so that the third phase winding (the second phase winding B) is electrically connected to the power supply negative terminal 31b.

When the rotor rotates to the second preset rotation position (L2), the control module 32 is configured to control the drive circuit 33 so that the third phase winding (the second phase winding B) is electrically disconnected from one of the power supply positive terminal 31a and the power supply negative terminal 31b and electrically connected to the other one of the power supply positive terminal 31a and the power supply negative terminal 31b. In the implementation manners illustrated in FIGS. 6A, 6B and 6C, when the rotor rotates to the second preset rotation position (L2), the control module 32 controls the drive circuit 33 so that the third phase winding (the second phase winding B) is electrically disconnected from the power supply negative terminal 31b and electrically connected to the power supply positive terminal 31a.

When the rotor rotates to the third preset rotation position (L3), the control module 32 controls the drive circuit 33 so that the first phase winding (the first phase winding A) is electrically disconnected from the power supply positive terminal 31a and electrically connected to the power supply negative terminal 31b or the second phase winding (the third phase winding C) is electrically disconnected from the power supply negative terminal 31b and electrically connected to the power supply positive terminal 31a. In the implementation manners illustrated in FIGS. 6A, 6C and 6C, when the rotor rotates to the third preset rotation position (L3), the control module 32 controls the drive circuit 33 so that the first phase winding (the first phase winding A) is electrically disconnected from the power supply positive terminal 31a and electrically connected to the power supply negative terminal 31b.

When the rotor is located between the first preset rotation position (L1) and the second preset rotation position (L2), the control module 32 is configured to control the drive circuit 33 so that the voltage (Ub) of the third phase winding (the second phase winding B) at least partially varies with the rotation position of the rotor at a preset rate of change.

In the implementation manner illustrated in FIG. 6A, when the rotor is located between the first preset rotation position (L1) and the second preset rotation position (L2), the control module 32 controls the drive circuit 33 so that the voltage (Ub) of the third phase winding (the second phase winding B) first maintains at the negative maximum value within a preset period of time, then gradually decreases from the negative maximum value to zero. In addition, the voltage (Ub) of the third phase winding (the second phase winding B) does not become zero until the rotor rotates to the third preset rotation position (L3). In the present example, the preset period of time refers to the time for the rotor to rotate at an electrical angle of 30°.

As illustrated in FIG. 6B, when the rotor is located between the first preset rotation position (L1) and the second preset rotation position (L2), the control module 32 controls the drive circuit 33 so that the voltage (Ub) of the third phase winding (the second phase winding B) first maintains at the negative maximum value within the preset period of time, then varies at the gradually decreasing rate of change with the rotation position of the rotor, and the rate of change of the voltage (Ub) of the third phase winding (the second phase winding B) gradually decreases to a zero value at the second preset rotation position (L2). In an example, the preset period of time refers to the time for the rotor to rotate at an electrical angle of 15°.

As illustrated in FIG. 6C, when the rotor is located between the first preset rotation position (L1) and the second preset rotation position (L2), the control module 32 is configured to control the drive circuit 33 so that the voltage (Ub) of the third phase winding (the second phase winding B) first maintains at the negative maximum value within the preset period of time, then varies at the gradually increasing rate of change with the rotation position of the rotor. The rate of change of the voltage (Ub) of the third phase winding (the second phase winding B) gradually increases, and the magnitude of the voltage (Ub) of the third phase winding (the second phase winding C) gradually increases from the negative maximum value at the first preset rotation position (the zero-position) to the zero value at the second preset rotation position (L1).

When the rotor is located between the second preset rotation position (L2) and the third preset rotation position (L3), the control module 32 controls the drive circuit 33 to implement in the following manners.

In the implementation manner illustrated in FIG. 6A, when the rotor is located between the second preset rotation position (L2) and the third preset rotation position (L3), the control module 32 controls the drive circuit 33 so that the voltage (Ub) of the third phase winding (the second phase winding B) starts from the zero value at the second preset rotation position (L2), and firstly varies with the rotation position of the rotor at a preset rate of change within a preset period of time until the maximum positive voltage is reached and remains unchanged until the rotor rotates to the third preset rotation position (L3). In an example, the preset period of time refers to the time for the rotor to rotate at an electrical angle of 30°.

In the implementation manners illustrated in FIGS. 6B and 6C, when the rotor is located between the first preset rotation position (L1) and the second preset rotation position (L2), the control module 32 controls the drive circuit 33 so that the voltage (Ub) of the third phase winding (the second phase winding B) at least partially varies at one of the gradually increasing rate of change and the gradually decreasing rate of change with the rotation position of the rotor. And when the rotor is located between the second preset rotation position (L2) and the third preset rotation position (L3), the control module 32 controls the drive circuit 33 so that the voltage (Ub) of the third phase winding (the second phase winding B) at least partially varies at the other one of the gradually increasing rate of change and the gradually decreasing rate of change with the rotation position of the rotor.

As illustrated in FIG. 6B, when the rotor is located between the second preset rotation position (L2) and the third preset rotation position (L3), the control module 32 controls the drive circuit 33 so that the voltage (Ub) of the third phase winding (the second phase winding B) firstly varies with the rotation position of the rotor at a gradually increasing rate of change within a preset period of time until a positive maximum value is reached, and then the voltage (Ub) of the third phase winding (the second phase winding B) remains unchanged. The voltage (Ub) of the third phase winding (the second phase winding B) gradually increases from a zero value at the second preset rotation position (L2) to a positive maximum value and maintains at the positive maximum value until the rotor rotates to the third preset rotation position (L3). In an example, the preset period of time refers to the time for the rotor to rotate at an electrical angle of 45°.

As illustrated in FIG. 6C, when the rotor is located between the second preset rotation position (L2) and the third preset rotation position (L3), the control module 32 controls the drive circuit 33 so that the voltage (Ub) of the third phase winding (the second phase winding B) firstly varies with the rotation position of the rotor at a gradually decreasing rate of change within a preset period of time until a positive maximum value is reached, and the voltage (Ub) of the third phase winding (the second phase winding B) remains unchanged until the rotor rotates to the third preset rotation position (L3). The voltage (Ub) of the third phase winding (the second phase winding B) gradually increases from a zero value at the second preset rotation position (L2) to a maximum positive voltage, and when the voltage (Ub) of the third phase winding (the second phase winding B) reaches the maximum positive voltage, the voltage (Ub) of the third phase winding (the second phase winding B) remains unchanged until the rotor rotates to the third preset rotation position (L3). In an example, the preset period of time refers to the time for the rotor to rotate at an electrical angle of 30°.

In other word, when the rotor is located between the second preset rotation position (L2) and the third preset rotation position (L3), the control module 32 is configured to control the drive circuit 33 so that the voltage (Ub) of the third phase winding (the second phase winding B) at least partially maintains unchanged.

Figure 11:
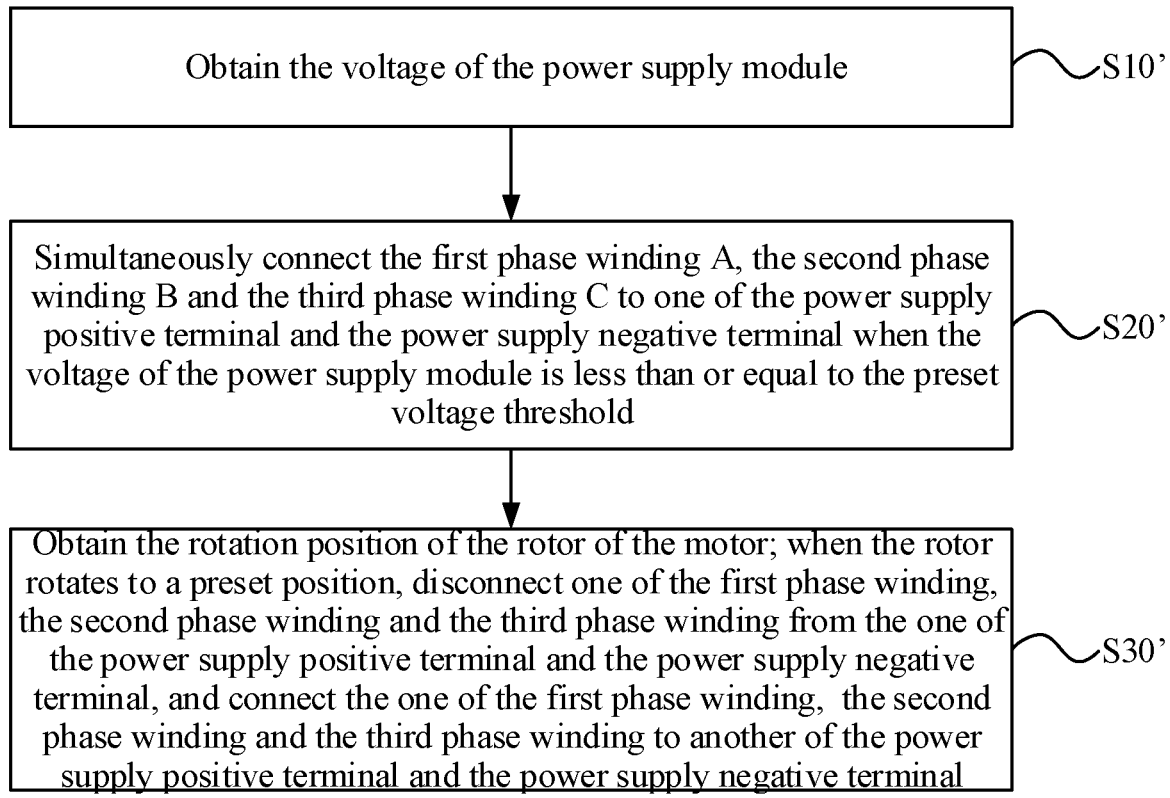
FIG. 11 is a flowchart illustrating a control method of the electric tool according to an example provided by the present application.

The present example further provides a control method for the electric tool. As illustrated in FIG. 11, the method is a control method for the control module 32 to control the drive circuit 33 in the present example, and includes the following steps.

In step S10', the voltage of the power supply module 31 is obtained.

In step S20', the first phase winding A, the second phase winding B and the third phase winding C are simultaneously connected to one of the power supply positive terminal 31a and the power supply negative terminal 31b when the voltage of the power supply module 31 is less than or equal to the preset voltage threshold.

In step S30', the rotation position of the rotor of the motor is obtained. When the rotor rotates to a preset position, one of the first phase winding, the second phase winding and the third phase winding is disconnected from the one of the power supply positive terminal and the power supply negative terminal and connected to the other one of the power supply positive terminal and the power supply negative terminal.

The above-described implementation manner is only one position interval in one cycle. During one cycle that the rotor rotates, that is, the rotor rotates at an electrical angle of 360°, the control module 32 controls the drive circuit 33 according to the rotation position of the rotor of the motor 34 so that the first phase winding, the second phase winding and the third phase winding are simultaneously connected to the power supply module 31.

Figure 12:
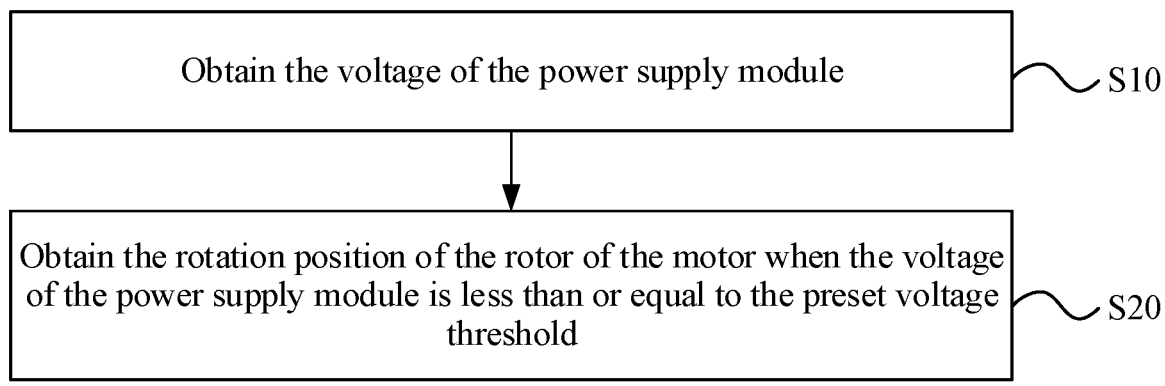
FIG. 12 is a flowchart illustrating another control method of the electric tool according to an example provided by the present application.

An example provides another control method for the electric tool. As shown in FIG. 12, the control method is that the control module 33 controls the drive circuit 33 according to the rotation position of the rotor of the motor 34 so that the first phase winding, the second phase winding and the third phase winding are simultaneously connected to the power supply module 31. The method includes the following steps.

In step S10, the voltage of the power supply module is obtained, where the first phase winding A, the second phase winding B and the third phase winding C are simultaneously connected to one of the power supply positive terminal 31a and the power supply negative terminal 31b when the voltage of the power supply module is less than or equal to the preset voltage threshold.

In step S20, the rotation position of the rotator of the motor is obtained. When the rotor rotates to the first preset position, a first one of the first phase winding A, the second phase winding B and the third phase winding C is disconnected from the one of the power supply positive terminal 31a and the power supply negative terminal 31b and connected to the other one of the power supply positive terminal 31a and the power supply negative terminal 31b. When the rotor rotates to the second preset position, a second one of the first phase winding A, the second phase winding B and the third phase winding C is disconnected from the one of the power supply positive terminal 31a and the power supply negative terminal 31b and connected to the other one of the power supply positive terminal 31a and the power supply negative terminal 31b. And when the rotor rotates to the third preset position, a third one of the first phase winding A, the second phase winding B and the third phase winding C is disconnected from the one of the power supply positive terminal 31a and the power supply negative terminal 31b and connected to the other one of the power supply positive terminal 31a and the power supply negative terminal 31b.

Referring to the implementation manners illustrated in FIGS. 6A, 6B and 6C, during one of the cycles (the rotor has rotated at an electrical angle of 360°) that the rotor has rotated, the control module 32 controls the drive circuit 33 to electrically connects each phase winding to the power supply module 31. The specific steps of such control method are described below.

In step S100, the first phase winding A and the third phase winding C are connected to the power supply positive terminal 31a, and the second phase winding B is connected to the power supply negative terminal 31b.

In step S200, when the rotor rotates to the first preset position (L1), the third phase winding C is disconnected from the power supply positive terminal 31a and connected to the power supply negative terminal 31b.

In step S300, when the rotor rotates to the second preset position (L2), the second phase winding B is disconnected from the power supply negative terminal 31b and connected to the power supply positive terminal 31a.

In step S400, when the rotor rotates to the third preset position (L3), the first phase winding A is disconnected from the power supply positive terminal 31a and connected to the power supply negative terminal 31b.

In step S500, when the rotor rotates to the fourth preset position (L4), the third phase winding C is disconnected from the power supply negative terminal 31b and connected to the power supply positive terminal 31a.

In step S600, when the rotor rotates to the fifth preset position (L5), the second phase winding B is disconnected from the power supply positive terminal 31a and connected to the power supply negative terminal 31b.

In step S700, when the rotor rotates to the sixth preset position (L6), the first phase winding A is disconnected from the power supply negative terminal 31b and connected to the power supply positive terminal 31a.

Comparing the control method adopted by the brushless motor in the electric tool of the related art with the above-mentioned improved control method, a corresponding relationship between the driving state and the output signal of the rotor position acquisition module 35 is shown below in Table 2.

TABLE 2

| Signal combinations related art | Driving state of the control method in the | Driving state of the improved control method |
|---|---|---|
| 101 | AB | ABC− |
| 100 | AC | ACB+ |
| 110 | BC | BCA− |
| 010 | BA | BAC+ |
| 011 | CA | CAB− |
| 001 | CB | CBA+ |

In Table 2, the symbol of "−" indicates that each phase winding tends to be connected to the power supply negative terminal 31b from being connected to the power supply positive terminal 31a within one direction commutation interval, and the symbol of "+" indicates that each phase winding tends to be connected to the power supply positive terminal 31a from being connected to the power supply negative terminal 31b within one direction commutation interval. For example, the symbol of "ABC−" indicates that the control module 32 controls the drive circuit 33 so that the first phase winding A is connected to the power supply positive terminal 31a, the second phase winding B is connected to the power supply negative terminal 31b, the third phase winding C is connected to the power supply positive terminal 31a, and the third phase winding C is disconnected from the power supply positive terminal 31a and connected to the power supply negative terminal 31b when the rotor rotates to a next preset position. The symbol of "BAC+" indicates that the control module 32 controls the drive circuit 33 so that the second phase winding B is connected to the power supply positive terminal 31a, the first phase winding A is connected to the power supply negative terminal 31b, the third phase winding C is connected to the power supply negative terminal 31b, and the third phase winding C is disconnected from the power supply negative terminal 31b and connected to the power supply positive terminal 31a when the rotor rotates to a next preset position.

According to the above method, continuous conduction time or continuous conduction electrical angle of each phase winding is increased to 180°, which improves output performance of the motor, so that even if using a power supply module 31 with low voltage lower than the preset voltage threshold, the electric tool 10 is still capable of reaching or substantially reaching output rotation speed and power of the electric tool using a power supply module 31 with voltage higher than the preset voltage threshold.

It should be noted that the control manner in which the control module 32 controls the electrical connection between each phase winding and the power supply module 31 is only for one of the cycles of that the rotor has rotated and is not limited herein.

In the above-described implementation manner, the control module 32 outputs the PWM signal to the drive circuit 33 so that the first phase winding A, the second phase winding B, and the third phase winding C are simultaneously connected to the power supply module 31.

The drive circuit 33 includes the drive switch, and the drive switch is capable of conducting an electrical connection between the third phase winding and the power supply module at a preset duty cycle under control of the control module 32.

When the rotor is located between the first preset rotation position and the second preset rotation position, the control module 31 is configured to control the drive switch to conduct the electrical connection between the third phase winding (one of the first phase winding A, the second phase winding B, and the third phase winding C) and the power supply module 31 in the above-mentioned implementation manner with a at least partially changing duty cycle. The above duty cycle can be obtained in a manner of table lookup or calculation. The changing duty cycle herein includes a duty cycle with a same rate of change and a duty cycle with a changing rate of change.

Hereinafter, description will be given by taking the first phase winding A as an example to illustrate a control manner that the control module 32 outputs the PWM signal to the drive circuit 33 to control each phase winding when the control module 32 controls the drive circuit 33 so that the three-phase windings are simultaneously connected to the power supply module 31 during one of the cycles (i.e., the rotor rotates at an electrical angle of 360°) that the rotor has rotated.

Figure 7A:
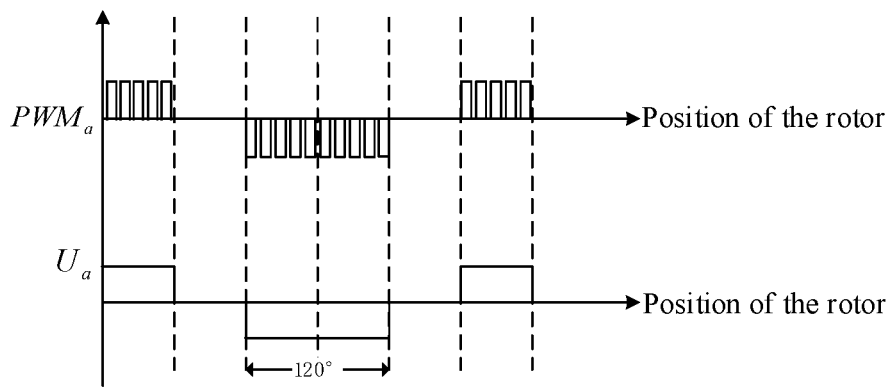
FIG. 7A is a diagram illustrating a corresponding relationship between a control signal of a first phase winding A, a voltage of the first phase winding A and a position of a rotor of the brushless motor in the electric tool in the related art.
Figure 7B:
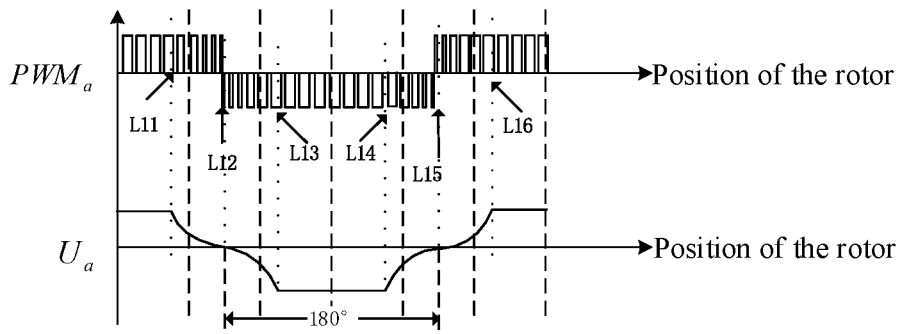
FIG. 7B is a diagram illustrating a corresponding relationship between a control signal of a first phase winding A, a voltage of the first phase winding A and a position of a rotor of the brushless motor in the electric tool according to an example provided by the present application.
Figure 7C:
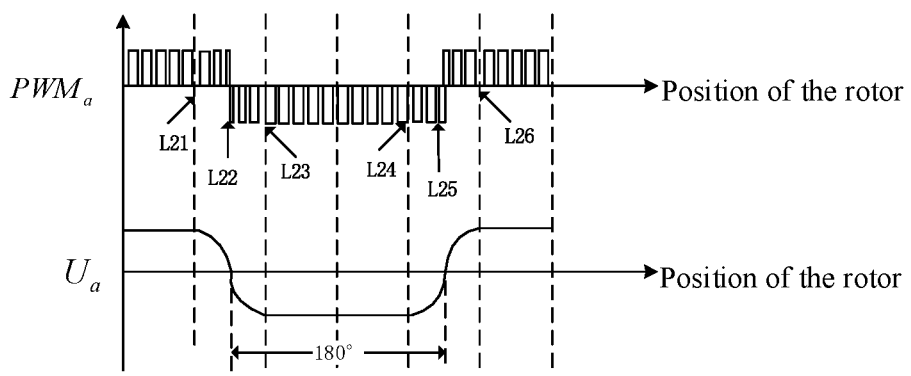
FIG. 7C is a diagram illustrating a corresponding relationship between the control signal of the first phase winding A, a voltage of the first phase winding A and the position of the rotor of the brushless motor in the electric tool according to another example provided by the present application.

Referring to FIGS. 7B and 7C, the control module 32 controls the drive circuit 33 to operate as follows. The control module 32 controls the high-side switch Q1 in the drive circuit 33 to firstly conduct the electrical connection between the first phase winding A and the power supply positive terminal 31a at a preset duty cycle. When the rotor rotates to the first preset rotation position (L11 and L21), the control module 32 controls the high-side switch Q1 to conduct the electrical connection between the first phase winding A and the power supply positive terminal 31a at a gradually decreasing duty cycle. When the rotor rotates to the second preset rotation position (L12 and L22), the duty cycle reduces to zero, and the control module 32 controls the low-side switch Q2 to conduct the electrical connection between the first phase winding A and the power supply negative terminal 31b at a gradually increasing duty cycle. When the rotor rotates to the third preset rotation position (L13 and L23), the duty cycle gradually increases to the preset duty cycle, and the control module 32 controls the low-side switch Q2 to conduct the electrical connection between the first phase winding A and the power supply negative terminal 31b at the preset duty cycle. When the rotor rotates to the fourth preset rotation position (L14 and L24), the control module 32 controls the low-side switch Q2 to conduct the electrical connection between the first phase winding A and the power supply negative terminal 31b at a gradually decreasing duty cycle. When the rotor rotates to the fifth preset rotation position (L15 and L25), the duty cycle gradually reduces to zero, and the control module 32 controls the high-side switch Q1 to conduct the electrical connection between the first phase winding A and the power supply positive terminal 31a at a gradually increasing duty cycle. When the rotor rotates to the sixth preset rotation position (L16 and L26), the duty cycle gradually increases to the preset duty cycle, and the control module 32 controls the high-side switch Q1 to conduct the electrical connection between the first phase winding A and the power supply positive terminal 31a at a certain preset duty cycle.

In the above-mentioned control method, the duty cycle may gradually increase or decrease with the rotation position of the rotor at an unchanged rate of change or may gradually increase or decrease with the rotation position of the rotor at a changing rate of change.

In practice, the change of the duty cycle, the different preset rotation positions, the preset duty cycle, etc. need to be set according to application occasions and specific working conditions of the electric tools to match application characteristics of different electric tools.

In an example, referring to FIG. 7B, during one of the cycles that the rotor has rotated, the control module 32 controls the high-side switch Q1 and the low-side switch Q2 to operate in the following manners. The control module 32 controls the high-side switch Q1 to firstly conduct the electrical connection between the first phase winding A and the power supply positive terminal 31a at a preset duty cycle (e.g., 80%). When the rotor rotates to an angular position L11 of 45°, the control module 32 controls the duty cycle conducted by the high-side switch Q1 to gradually decrease at a gradually decreasing rate of change. When the rotor rotates to an angular position L12 of 90°, the duty cycle reduces to 0%, and the control module 32 controls the duty cycle conducted by the low-side switch Q2 to gradually increase at a gradually increasing rate of change. When the rotor rotates to an angular position L13 of 135°, the duty cycle increases to the preset duty cycle (80%), and the control module 32 controls the duty cycle conducted by the low-side switch Q2 to maintain at the preset duty cycle. When the rotor rotates to an angular position L14 of 225°, the control module 32 controls the duty cycle conducted by the low-side switch Q2 to gradually decrease at a gradually decreasing rate of change. When the rotor rotates to an angular position L15 of 270°, the duty cycle reduces to 0%, and the control module 32 controls the duty cycle conducted by the high-side switch Q1 to gradually increase at a gradually increasing rate of change. When the rotor rotates to an angular position L16 of 315°, the duty cycle increases to the preset duty cycle (80%), and the control module 32 controls the duty cycle conducted by the high-side switch Q1 to maintain at the preset duty cycle.

In an example, referring to FIG. 7C, during one of the cycles that the rotor has rotated, the control module 32 controls the high-side switch Q1 and the low-side switch Q2 to operate in the following manners. The control module 32 controls the high-side switch Q1 to firstly conduct the electrical connection between the first phase winding A and the power supply positive terminal 31a at a preset duty cycle (e.g., 100%). When the rotor rotates to an angular position L21 of 60°, the control module 32 controls the duty cycle conducted by the high-side switch Q1 to gradually decrease at a gradually increasing rate of change. When the rotor rotates to an angular position L22 of 90°, the duty cycle reduces to 0%, and the control module 32 controls the duty cycle conducted by the low-side switch Q2 to gradually increase at a gradually decreasing rate of change. When the rotor rotates to an angular position L23 of 120°, the duty cycle increases to the preset duty cycle, and the control module 32 controls the duty cycle conducted by the low-side switch Q2 to maintain at the preset duty cycle. When the rotor rotates to an angular position L24 of 240°, the control module 32 controls the duty cycle conducted by the low-side switch Q2 to gradually decrease at a gradually increasing rate of change. When the rotor rotates to an angular position L25 of 270°, the duty cycle reduces to 0%, and the control module 32 controls the duty cycle conducted by the high-side switch Q1 to gradually increase at a gradually decreasing rate of change. When the rotor rotates to an angular position L26 of 300°, the duty cycle increases to the preset duty cycle, and the control module 32 controls the duty cycle conducted by the high-side switch Q1 to maintain at the preset duty cycle.

FIG. 6A illustrates the control manner in the related art. During one cycle that the rotor rotates, that is, the rotor has rotated at an electrical angle of 360°, a continuous conduction electrical angle of the first phase winding A is 120°, while FIGS. 6B and 6C illustrate two implementation manners of the control manner of the present example, in which the first phase winding A has a continuous conduction electrical angle of 180° during one cycle that the rotor has rotated. In this way, during one cycle (i.e., the rotor has rotated 360°) that the rotator has rotated, the continuous conduction time of each drive switch is 180°, so that the continuous conduction time of each phase winding increases to 180°. Compared with the continuous conduction time of 120° of each phase winding in the electric tool in the related art, the above-mentioned electric tool and the control method thereof improve efficiency of the motor. It should be noted that the above-mentioned example is only a description of the control method within one of the cycles that the rotor has rotated and is not limited herein.

In an example, the control module 32 further includes a timing unit, a calculation unit configured to process data, and a storage unit configured for storage.

In an example, the calculation unit is configured to calculate the position of the rotor (i.e., the angle that the rotor has rotated) according to a position signal transmitted by the rotor position acquisition module 35. The storage unit stores the position of the rotor (i.e., the rotation angle that the rotor has rotated) and the duty cycle conducted by each drive switch in the drive circuit 33 controlled by the control module 32 and establishes a corresponding relationship table between the duty cycle conducted by each drive switch and the position of the rotor. In this way, according to the information table of the corresponding relationship between the duty cycle conducted by each drive switch and the rotation position of the rotor, the duty cycle conducted by each drive switch corresponding to a next rotation position of the rotor can be obtained. The control module 32 outputs a corresponding control signal next time so that each drive switch operates according to a corresponding conducted duty cycle, thereby making the voltages of the three-phase windings change with the rotation position of the rotor according to a preset change rule.

In an example, the calculation unit is configured to calculate the rotation position of the rotor (i.e., the angle that the rotor has rotated) according to the position signal transmitted by the rotor position acquisition module 35. The storage unit is configured to store the rotation position of the rotor and the duty cycle conducted by each drive switch in the drive circuit 33 controlled by the control module 32 and establish a corresponding functional relationship between the duty cycle conducted by each drive switch and the position of the rotor. The calculation unit is further configured to calculate a duty cycle that each drive switch shall conduct next time according to the calculated rotation position of the rotor and the corresponding functional relationship between the duty cycle conducted by each drive switch and the rotation position of the rotor.

The timing unit records rotation time of the rotor and establishes a corresponding relationship table between time data and angle data. Assuming that it takes time t for the rotor to rotate an angle of θ, a next rotation position of the rotor can be determined according to rotation time of the rotor. The preset period of time in the above examples can be realized according to timing time of the timing unit.

In order to obtain better motor output characteristics, the speed can also be increased by adjusting the phase angle of the voltage of each phase winding.

Figure 8:
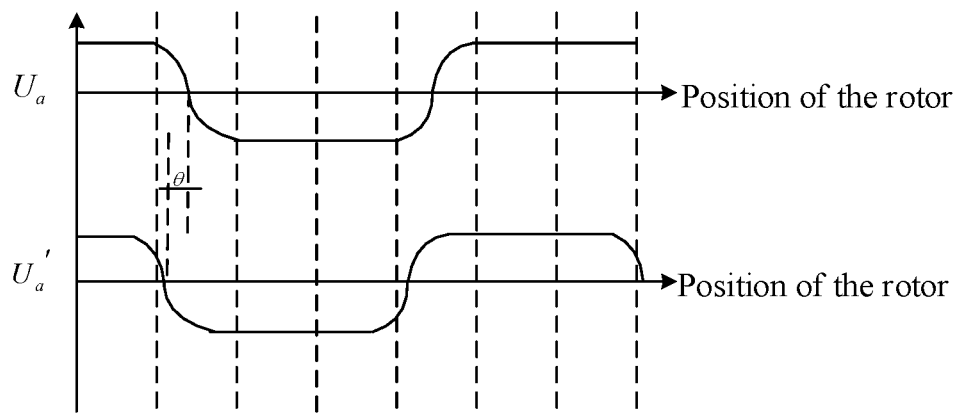
FIG. 8 is a curve graph illustrating a corresponding relationship between the voltage of the first phase winding A and the position of the rotor of the brushless motor before and after phase adjustment according to an example provided by the present application.

Taking the first phase winding A as an example, a method for adjusting the phase angle of the voltage of each phase winding is illustrated with reference to FIG. 8. In an example, the preset positions can be simultaneously moved forward or backward in the above control method. For example, in FIG. 7C, when the rotor rotates to the first preset position of an angle of 60°, the control module 32 controls the high-side switch Q1 to change the duty cycle from the previously preset duty cycle to a gradually decreasing duty cycle. In order to advance the phase angle, in FIG. 8, the first preset position in FIG. 7C can be moved forward by an angle of θ (e.g., 15°), so that when the rotor rotates to the first preset position (60°—θ, e.g., 35°), the control module 32 controls the high-side switch Q1 to change the duty cycle from the previously preset duty cycle to a gradually decreasing duty cycle. In this way, the second preset position, the third preset position, the fourth preset position, the fifth preset position and the sixth preset position each need to move forward by angle of θ.

In an actual situation, the angle of θ is set according to specific application occasions to obtain better output characteristics of the motor. In an example, the angle of θ ranges from −60° to +10°, where "−" indicates that all preset positions are moved forward, for example, "−60°" indicates that all preset positions are moved forward by 60°; while "+" indicates that all preset positions are moved backward, for example, "+10°" indicates that all preset positions are moved backward by 10°.

With the above-mentioned implementation manners, for the electric tool 10 using the battery pack 20 as the power supply module 31, on the one hand, an electric tool 10 requiring power supply from a battery pack 20 with a high voltage (a rated voltage) can also meet the output characteristic requirements when the electric tool 10 is connected to a battery pack 20 with a low voltage (a rated voltage). On the other hand, the performance of the electric tool 10 connected to the battery pack 20 with the low voltage is close to that of the electric tool 10 connected to the battery pack 20 with the high voltage, thereby improving the output performance of the electric tool 10 connected to the battery pack 20 with the low voltage. That is, when the electric tool 10 is connected to the battery pack 20 with a first voltage, the motor 34 is configured to output a first output power and a first rotation speed. After adopting the electric tool and the control method thereof in the present example, when the electric tool 10 is connected to a battery pack 20 with a second voltage, the motor 34 is configured to output at least one of a second rotation speed close to the first rotation speed and a second output power close to the first output power. The second voltage and the first voltage each are the rated voltage of the battery pack, and the second voltage is less than the first voltage. That is to say, by adopting the above method, the motor output rotation speed and output power of the electric tool 10 are increased.

In the above-mentioned solution, the rotation speed of the motor of the electric tool is increased by increasing the continuous conduction time or the continuous conduction electrical angle of each phase winding, so that the performance of the electric tool powered by the low voltage is close to that of the electric tool powered by the high voltage. In addition, the electric tool using the high voltage for power supply can also meet the output characteristic requirements when using the power supply module with the low voltage for power supply. In this way, the power supply module with the low voltage can be used as a backup power supply module for the electric tool using the high voltage for power supply, that is, the power supply module (e.g., the battery pack) with a same voltage can be applied to electric tools with different output requirements, thereby improving a utilization rate of the power supply module. In addition, by improving the output performance of the electric tool, a same type of electric tools can be adapted to power supply modules with different voltages, and different motor characteristic curves can be configured according to the use occasions and requirements of different electric tools, thereby improving working efficiency and working effect of the electric tool.

Figure 9:
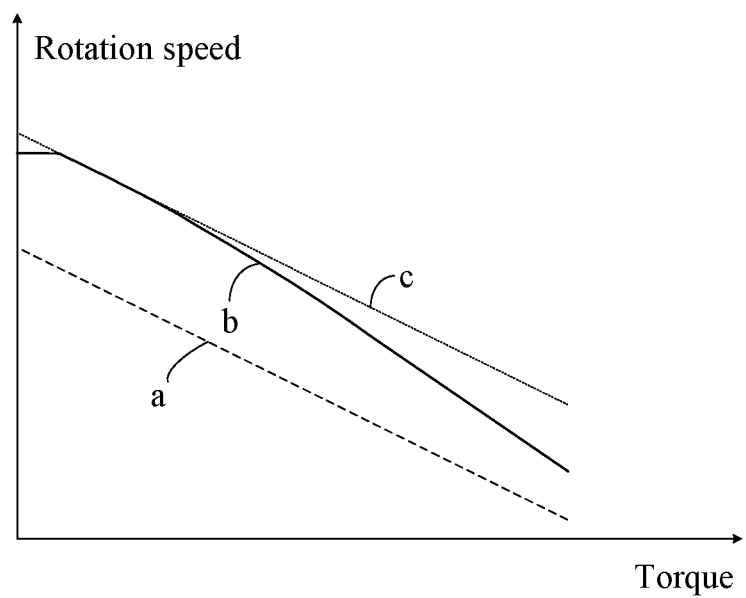
FIG. 9 is a curve graph illustrating output characteristic of the electric tool with a rated voltage of 48V when using battery packs with different voltages.

FIG. 9 illustrates an output characteristic curve of an electric tool with a rated voltage of 48V. The curve a illustrates an output characteristic curve (rotation speed-torque relationship diagram) of the electric tool when the electric tool is powered by a battery pack with a low voltage (24V). The curve c illustrates an output characteristic curve (rotation speed-torque relationship diagram) of the electric tool when the electric tool is powered by a battery pack with a high voltage (48V). The curve b illustrates an output characteristic curve (rotation speed-torque relationship diagram) of the electric tool when the battery pack with the low voltage (24V) is used for power supply by adopting the above control method. As can be seen from FIG. 9, the curve b approximates the curve c. Therefore, by adopting the above control method, the output characteristics of the electric tool requiring being powered by the power supply with the high voltage when the power supply with low voltage is used are similar to those of the electric tool powered by the power supply with the high voltage, and the requirements can be met.

Figure 10A:
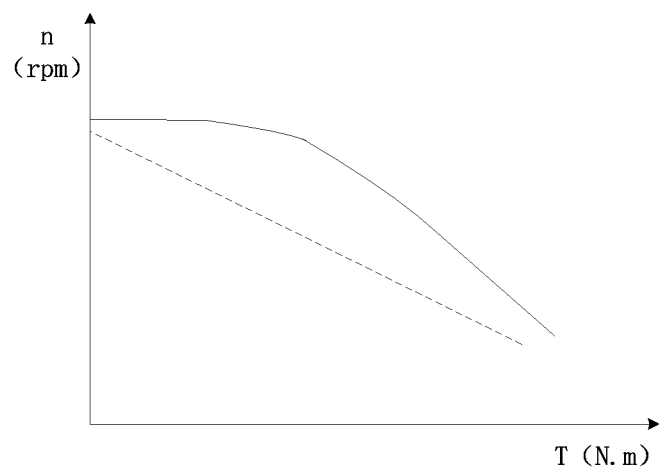
FIGS. 10A, 10B and 10C are curve graphs illustrating rotation speed comparison between the electric tool in the related art and electric tools in different examples of the present application.
Figure 10B:
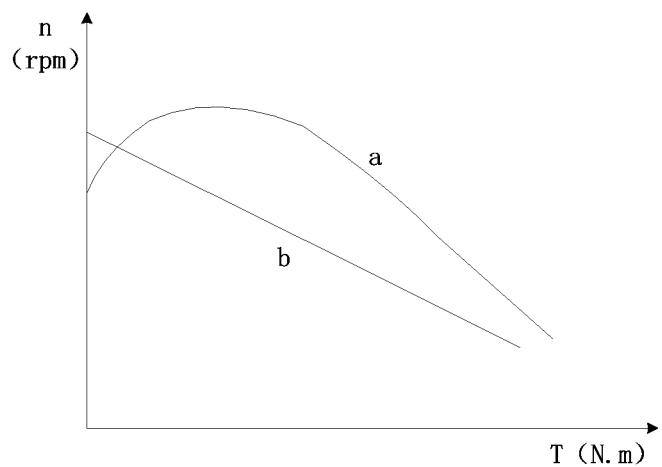
Figure 10C:
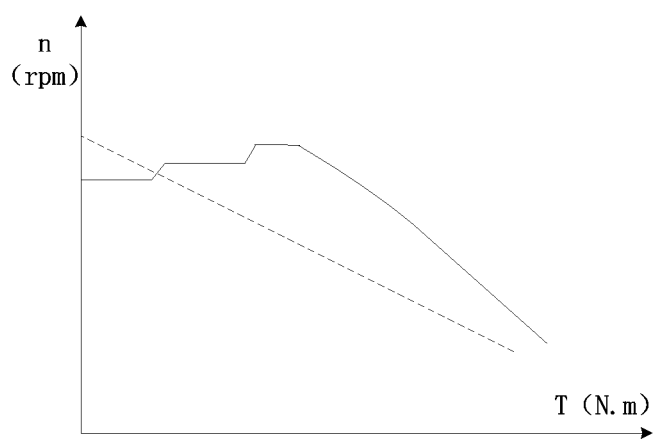

FIGS. 10A, 10B, and 10C illustrate rotation speed comparison curves of different types of electric tools. An abscissa indicates torque T and the unit thereof is N.mm. An ordinate indicates rotation speed n, and the unit thereof is rpm. A dotted line indicates a curve of the rotation speed n of the electric tool in the related art varying with the torque T, and a solid line indicates a curve of the rotation speed n of the electric tool adopting the above solution varying with the torque T. As can be seen from FIGS. 10A, 10B and 10C, the electric tool with heavy load adopting the above solution has a higher rotation speed compared with the electric tool in the related art. In addition, different motor output characteristic curves can be configured by adopting the above solution. The electric tool illustrated in FIG. 10A may be a hair dryer requiring a relative high rotation speed. After adopting the above solution, the hair dryer has a higher rotation speed, a larger amount of air and a larger thrust force, thereby blowing heavier objects (e.g., stones). The electric tool illustrated in FIG. 10B may be an impact drill with required rotation speed and impact frequency. After adopting the above solution, the rotation speed is mated with an appropriate impact frequency, which can effectively improve impact efficiency and impact performance of the whole machine. The electric tool illustrated in FIG. 10C may be a snow blower. After adopting the above solution, a constant and lower rotation speed may be used when snow is less and load is light, so as to save energy and increase time of endurance. With increasing snow throwing amount, that is, when the load increases, the rotation speed of the motor is increased to speed up snow throwing speed and avoid snow accumulation in a machine cavity.

The electric tool provided by the present example is capable of adapting to different power supply voltages and meet the requirement of output characteristics by improving compatibility of multi-voltage power supply.

Electric tools are not limited to the above-mentioned devices. The above solution can be adopted by electric tools, such as hair dryers, impact drills, snow blowers, electric circular saws, curve saws, diagonal saws, reciprocating saws, angle grinders, cutting machines and lawn mowers, which are driven by brushless motors.

It should be noted that the present application is not limited to DC brushless electric tools, and all applications using the above control method shall fall within the scope of the present application.

What is claimed is:

1. An electric tool, comprising:
a function member configured to realize a function of the electric tool;
a motor configured to drive the function member, wherein the motor comprises a rotor, a first phase winding, a second phase winding, and a third phase winding;
a drive circuit electrically connected to the first phase winding, the second phase winding, and the third phase winding and configured to drive the motor to output power;
a power supply module electrically connected to the drive circuit and configured to supply power to the first phase winding, the second phase winding, and the third phase winding through the drive circuit; and
a control module connected to the drive circuit and configured to output a control signal to control the drive circuit;
wherein the control module is configured to control the drive circuit according to a rotation position of the rotor of the motor in a case where a voltage of the power supply module is less than or equal to a preset voltage threshold so that the first phase winding, the second phase winding, and the third phase winding are simultaneously connected to the power supply module,
wherein the power supply module includes a power supply positive terminal and a power supply negative terminal, the power supply module is configured to cause a potential difference between the power supply positive terminal and the power supply negative terminal, the control module is configured to control the drive circuit in a case where the rotor rotates to a first preset rotation position so that the first phase winding is electrically connected to the power supply positive terminal, the second phase winding is electrically connected to the power supply negative terminal, and the third phase winding is electrically connected to one of the power supply positive terminal and the power supply negative terminal, and the control module is further configured to control the drive circuit in a case where the rotor rotates to a second preset rotation position so that the third phase winding is electrically disconnected from the one of the power supply positive terminal and the power supply negative terminal and electrically connected to another of the power supply positive terminal and the power supply negative terminal.

2. The electric tool of claim 1, wherein the control module is configured to control the drive circuit in a case where the rotor rotates to a third preset rotation position so that the first phase winding is electrically disconnected from the power supply positive terminal and electrically connected to the power supply negative terminal or the second phase winding is electrically disconnected from the power supply negative terminal and electrically connected to the power supply positive terminal.

3. The electric tool of claim 2, wherein the control module is configured to control the drive circuit in a case where the rotor is located between the second preset rotation position and the third preset rotation position so that a voltage of the third phase winding at least partially maintains unchanged.

4. The electric tool of claim 2, wherein the control module is configured to control the drive circuit in a case where the rotor is located between the first preset rotation position and the second preset rotation position so that a voltage of the third phase winding at least partially varies with the rotation position of the rotor at one of a gradually increasing rate of change and a gradually decreasing rate of change and the control module is configured to control the drive circuit in a case where the rotor is located between the second preset rotation position and the third preset rotation position so that the voltage of the third phase winding at least partially varies with the rotation position of the rotor at another of the gradually increasing rate of change and the gradually decreasing rate of change.

5. The electric tool of claim 2, wherein the drive circuit comprises a drive switch, the drive switch is capable of conducting an electrical connection between the third phase winding and the power supply module at a preset duty cycle under control of the control module, and the control module is configured to control the drive switch to at least partially conduct the electrical connection between the third phase winding and the power supply module with a changing duty cycle in a case where the rotor is located between the first preset rotation position and the second preset rotation position.

6. The electric tool of claim 5, wherein the control module further comprises a storage unit configured to store a corresponding relationship table between the duty cycle and the rotation position of the rotor.

7. The electric tool of claim 5, wherein the control module further comprises a calculation unit configured to calculate the duty cycle according to the rotation position of the rotor.

8. The electric tool of claim 1, wherein the control module is configured to control the drive circuit in a case where the rotor is located between the first preset rotation position and the second preset rotation position so that a voltage of the third phase winding at least partially varies with the rotation position of the rotor at a preset rate of change.

9. The electric tool of claim 1, wherein the control module is configured to control the drive circuit in a case where the rotor is located between the first preset rotation position and the second preset rotation position so that a voltage of the third phase winding at least partially varies with the rotation position of the rotor at a changing rate of change.

10. The electric tool of claim 1, wherein a voltage of the first phase winding, a voltage of the second phase winding, and a voltage of the third phase winding form a phase difference of 120°.

11. An electric tool, comprising:
a function member configured to realize a function of the electric tool;
a motor configured to drive the function member, wherein the motor comprises a rotor, a first phase winding, a second phase winding, and a third phase winding;
a drive circuit electrically connected to the first phase winding, the second phase winding, and the third phase winding and configured to drive the motor to output power;
a power supply module electrically connected to the drive circuit and configured to supply power to the first phase winding, the second phase winding, and the third phase winding through the drive circuit; and
a control module connected to the drive circuit and configured to output a control signal to control the drive circuit;
wherein the control module is configured to control the drive circuit according to a rotation position of the rotor of the motor in a case where a voltage of the power supply module is less than or equal to a preset voltage threshold so that the first phase winding, the second phase winding, and the third phase winding are simultaneously connected to the power supply module,
wherein the electric tool comprises a voltage detection module configured to detect the voltage of the power supply module, the voltage detection module is connected to the control module, and the control module is configured to determine whether the voltage of the power supply module is less than the preset voltage threshold according to a detection signal from the voltage detection module.

12. An electric tool, comprising:
a function member configured to realize a function of the electric tool;
a motor configured to drive the function member, wherein the motor comprises a rotor, a first phase winding, a second phase winding, and a third phase winding;
a drive circuit electrically connected to the first phase winding, the second phase winding, and the third phase winding and configured to drive the motor to output power;
a power supply module electrically connected to the drive circuit and configured to supply power to the first phase winding, the second phase winding, and the third phase winding through the drive circuit; and
a control module connected to the drive circuit and configured to output a control signal to control the drive circuit;
wherein the control module is configured to control the drive circuit according to a rotation position of the rotor of the motor in a case where a voltage of the power supply module is less than or equal to a preset voltage threshold so that the first phase winding, the second phase winding, and the third phase winding are simultaneously connected to the power supply module,
wherein the electric tool comprises a current detection module configured to detect current of the motor, the current detection module is connected to the control module, and the control module is configured to determine whether the voltage of the power supply module is less than the preset voltage threshold according to a detection signal from the current detection module.

13. An electric tool, comprising:
a function member configured to realize a function of the electric tool;
a motor configured to drive the function member, wherein the motor comprises a rotor, a first phase winding, a second phase winding, and a third phase winding;
a drive circuit electrically connected to the first phase winding, the second phase winding, and the third phase winding and configured to drive the motor to output power;
a power supply module electrically connected to the drive circuit and configured to supply power to the first phase winding, the second phase winding, and the third phase winding through the drive circuit; and
a control module connected to the drive circuit and configured to output a control signal to control the drive circuit;
wherein the control module is configured to control the drive circuit according to a rotation position of the rotor of the motor in a case where a voltage of the power supply module is less than or equal to a preset voltage threshold so that the first phase winding, the second phase winding, and the third phase winding are simultaneously connected to the power supply module,
wherein the control module is electrically connected to the drive circuit and configured to transmit a control signal to the drive circuit so that phase angles of a voltage of the first phase winding, a voltage of the second phase winding, and a voltage of the third phase winding are advanced or lagged by a preset angle.

* * * * *